(12) United States Patent
Matsui et al.

(10) Patent No.: US 7,837,250 B2
(45) Date of Patent: Nov. 23, 2010

(54) OPENING/CLOSING DEVICE FOR ROOF PANEL

(75) Inventors: Shinya Matsui, Hiroshima (JP); Koji Sawahata, Hiroshima (JP); Kozo Odoi, Hiroshima (JP)

(73) Assignee: Webasto AG (DE)

( * ) Notice: Subject to any disclaimer, the term of this patent is extended or adjusted under 35 U.S.C. 154(b) by 12 days.

(21) Appl. No.: 12/295,180

(22) PCT Filed: Mar. 28, 2007

(86) PCT No.: PCT/JP2007/056577
§ 371 (c)(1),
(2), (4) Date: Nov. 26, 2008

(87) PCT Pub. No.: WO2007/114137
PCT Pub. Date: Oct. 11, 2007

(65) Prior Publication Data
US 2009/0160225 A1 Jun. 25, 2009

(30) Foreign Application Priority Data
Mar. 28, 2006 (JP) ............................. 2006-088838

(51) Int. Cl.
*B60J 7/185* (2006.01)
(52) U.S. Cl. ................. 296/120.1; 296/121; 296/107.17
(58) Field of Classification Search ............ 296/107.16, 296/121, 120.1, 128
See application file for complete search history.

(56) References Cited

U.S. PATENT DOCUMENTS

| | | | | |
|---|---|---|---|---|
| 2,715,545 A | * | 8/1955 | Orr | 296/117 |
| 5,026,110 A | * | 6/1991 | Koop et al. | 296/108 |
| 5,052,740 A | * | 10/1991 | Bauer et al. | 296/120.1 |
| 2002/0105205 A1 | * | 8/2002 | Willard | 296/107.07 |
| 2003/0197395 A1 | | 10/2003 | Reinsch | |
| 2007/0170750 A1 | * | 7/2007 | Just et al. | 296/121 |

FOREIGN PATENT DOCUMENTS

| | | |
|---|---|---|
| DE | 103 15 100 B3 | 12/2004 |
| EP | 0 351 378 A1 | 1/1990 |
| FR | 2 844 223 A1 | 3/2004 |
| JP | 02-109724 | 4/1990 |
| JP | 2002-264657 A | 9/2002 |
| JP | 2003-231418 A | 8/2003 |

OTHER PUBLICATIONS

International Search Report; PCT/JP2007/056577; Date Jul. 3, 2007.
Extended European Search Report dated Jan. 27, 2010; Application No. / Patent No. 07740015.8-1268 / 2006137 PCT/JP2007056577.

* cited by examiner

*Primary Examiner*—Dennis H Pedder
(74) *Attorney, Agent, or Firm*—Studebaker & Brackett PC; Donald R. Studebaker

(57) ABSTRACT

To reliably prevent lifting of a roof panel when the roof panel is fully closed. To provide a roof panel (12) to a vehicle body (1) capable of opening/closing a vehicle cabin space (11), a link mechanism (3) for supporting the roof panel (12) at the vehicle body (1) having a front connecting link (33) rotatably connected to both of the vehicle body (1) and the roof panel (12), and a rear connecting link (34) rotatably connected to both of the vehicle body (1) and the roof panel (12) at rear side of a vehicle relative to front connecting link (33), and link restricting mechanism (500) for restricting the rear connecting link (34) to the vehicle body (1) when the roof panel (12) is in fully closed state over the vehicle cabin space (11).

3 Claims, 14 Drawing Sheets

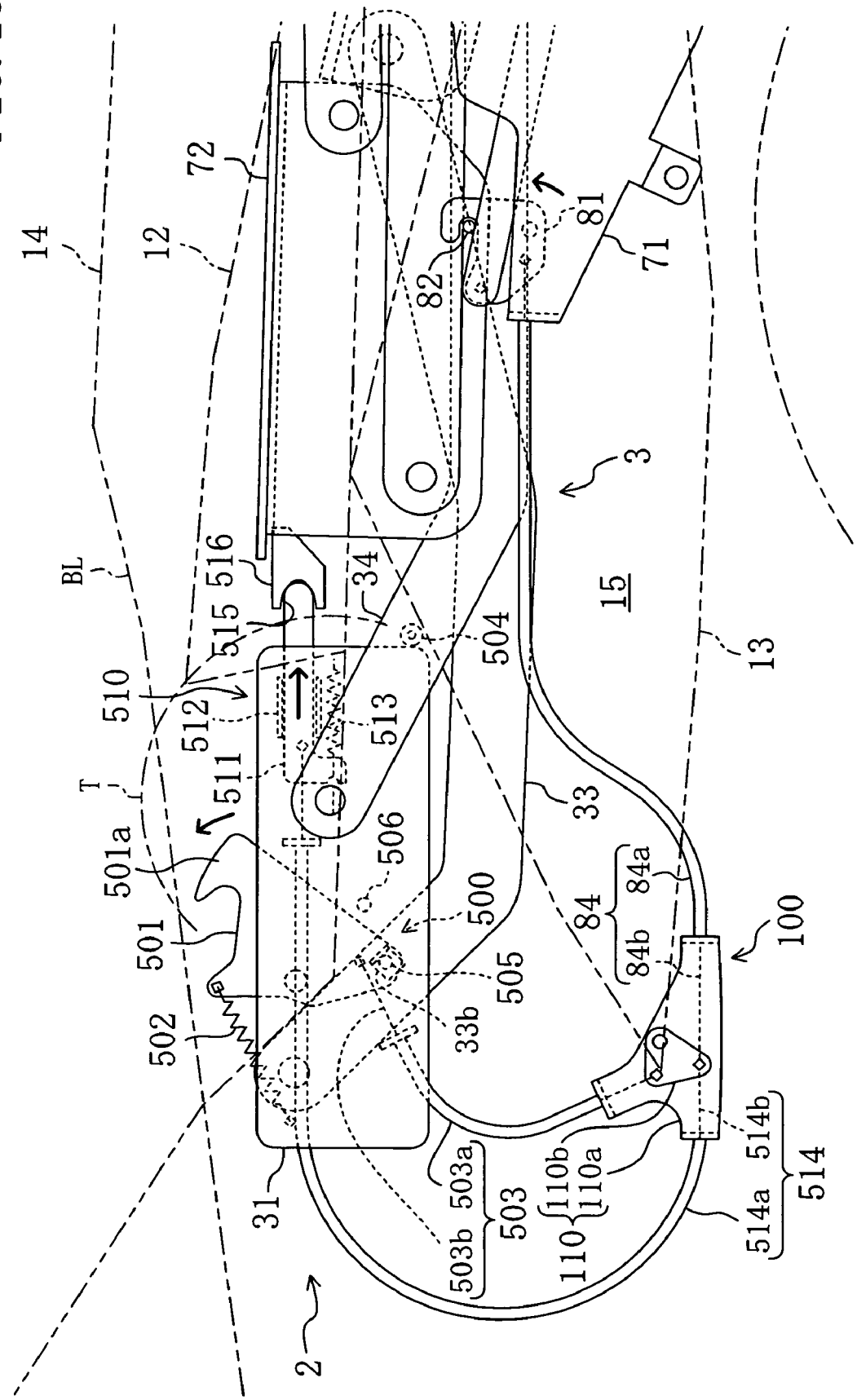

OPENING/CLOSING DEVICE FOR ROOF PANEL

TECHNICAL FIELD

The present invention relates to an opening/closing device for a roof panel for preventing lifting of the roof panel in fully closed state, which room panel is supported by a vehicle body via a link mechanism and capable of opening and closing a vehicle cabin space.

BACKGROUND ART

According to conventional art, there is provided a vehicle with such a configuration that a roof panel is supported by a vehicle body via a link mechanism to allow opening/closing of the roof panel (see Patent Document 1). In particular, said link mechanism includes a front connecting link member being rotatably connected to each of said roof panel and vehicle body, and a rear connecting link member being rotatably connected to each of said roof panel and vehicle body at rear side of the vehicle than the front connecting link member, thereby composing a so-called four-jointed link mechanism. The roof panel can be opened or closed with respect to the vehicle body by driving the link mechanism.

In this vehicle, front edge portion of the roof panel is held by a front header of the vehicle body when the roof panel is in fully closed state. However, while a vehicle is running, a force to lift the roof panel upwardly is applied to the roof panel by aerodynamic force. If the force for lifting is excessive, the roof panel is lifted, and there is a possibility that airtightness between the roof panel and vehicle body is deteriorated.

The vehicle relating to Paten Document 1 is therefore equipped with a link restricting mechanism for restricting said link mechanism when the roof panel is in fully closed state. In particular, said link restricting mechanism includes an engaging pin provided to a front connecting link member and a hook member provided to a rear connecting link member to be engaged with the engaging pin to allow restriction of the front connecting link member and the rear connecting link member through engagement of the hook member and the engaging pin.

Thus, when the roof panel is in fully closed state, rigidity of the link mechanism is improved by restricting movements of the link mechanism, thereby suppressing lifting of the roof panel by the link mechanism.

Paten Document: Japanese Unexamined Patent Publication No. 2002-264657

DISCLOSURE OF INVENTION

Problems that the Invention is to Solve

However, each of the front connecting link member and the rear connecting link member restricted by said link restricting mechanism is a member being rotatably connected to the vehicle body and the roof panel, and there is a possibility that they rotate slightly relative to the vehicle body and the roof panel even if being restricted by said link restricting mechanism. In other words, although rigidity of the link mechanism is improved by the link restricting mechanism, rigidity obtained is not enough and still there is a room for improvement.

The present invention has been developed in view of the above aspects, and an object of the present invention is to reliably prevent lifting of the roof panel when the roof panel is in fully closed state.

Means for Solving the Problems

The present invention aims to restrict either of the connecting link members of both connecting link members to the vehicle body instead of restricting rotatable connecting link members themselves.

In particular, a first invention is an opening/closing device for a roof panel which is comprising a roof panel provided to a vehicle body, capable of opening and closing a vehicle cabin space, a link mechanism for supporting the roof panel at the vehicle body, having a front connecting link member rotatably connected to each of said vehicle body and said roof panel, and a rear connecting link member rotatably connected to each of the vehicle body and the roof panel at rear side of the vehicle relative to the front connecting link member, and a link restricting mechanism for restricting one of said front connecting link member and said rear connecting link member to the vehicle body when said roof panel is in fully closed state in which the vehicle cabin space is closed.

With above-mentioned configuration, since one of connecting link members of the front connecting link member and the rear connecting link member constituting said link mechanism is restricted to the vehicle body by said link restricting mechanism, the one of connecting link members can be made not rotatable with respect to the vehicle body, and this allows restriction of said link mechanism with high rigidity when said roof panel is in said fully closed state. As a result, the roof panel can be held with high rigidity in fully closed state, thereby preventing the lifting of the roof panel due to aerodynamic force.

In a second invention related to the first invention, said link restricting mechanism comprising an engaging member provided to the vehicle body, a counter engaging portion to be engaged with said engaging member, being provided to one of said front connecting link member and said rear connecting member, and a driving portion for driving the engaging member so as to engage said engaging member with said counter engaging portion and to disengage the same.

Supposedly, if said hook member is provided to the connecting link member and said counter engaging portion is provided to the vehicle body, it is necessary to provide said driving portion and a parts relating thereto (e.g., wiring) to the connecting link member. Since the connecting link member is a rotating member, the driving portion and the parts relating thereto should be movably disposed in accordance with the connecting link member, resulting in complicated disposition.

Then, with above-mentioned configuration, when said hook member is provided to the vehicle body, disposition of said driving portion and the parts relating thereto becomes easy.

In a third invention related to the first or second invention, a front edge of said roof panel is configured to be supported by the vehicle body during said fully closed state, and said link restricting mechanism restricts said rear connecting link member to the vehicle body.

With above-mentioned configuration, since the front edge portion of said roof panel is held to the vehicle body in fully closed state, lifting of the roof panel at vehicle front side occurs relatively hardly while lifting of the same at vehicle rear side occurs relatively easily. In view of the foregoing, said link restricting mechanism restricts the rear connecting link member. As a result, holding rigidity of the roof panel at more rear part of the vehicle can be improved, thereby effectively preventing the lifting of the roof panel.

In a fourth invention related to the second invention, said engaging member has a hook portion formed in a bent hook shape and is provided to the vehicle body rotatably between an engaging position and a disengaging position, and has a biasing member for biasing the engaging member in a direction from the disengaging position to the engaging position so as to engage an inner periphery of the hooked portion with said counter engaging portion, said driving portion is configured to rotate the engaging member from the engaging position to the disengaging position against biasing force of the biasing member so as to disengage inner periphery of said hook portion from said counter engaging portion, and a front end portion of the inner periphery of said hook portion is formed in a configuration being opened towards outside with respect to a circumference, which is centered at a rotation center of said engaging member and passes over said counter engaging portion.

With above-mentioned configuration, when said hook member is rotated, the inner periphery of the hook portion of the hook member engages with said counter engaging portion, thereby restricting said connecting link member. In this case, if the counter engaging portion has an installation error, there is a possibility that forefront of the hook portion and the counter engaging portion collide and the counter engaging portion does not engage well with inner periphery of the hook portion. In view of the foregoing, forefront part of the inner periphery of said hook portion has a profile opened outside with respect to circumference passing on said counter engaging portion while rotation center of said hook member is centered. As a result, the counter engaging portion contacts with forefront part of the inner periphery opened outside with respect to the circumference instead of forefront of the hook portion, even if the counter engaging portion has installation error, and the inner periphery of the hook portion can be reliably engaged with the counter engaging portion.

In a fifth invention related to the second invention, said engaging member has a hook portion formed in a bent hook shape and is provided to the vehicle body rotatably between an engaging position and a disengaging position, and has a biasing member for biasing the engaging member in a direction from the disengaging position to the engaging position so as to engage an inner periphery of the hooked portion with said counter engaging portion, said driving portion is configured to rotate the engaging member from the engaging position to the disengaging position against biasing force of the biasing member so as to disengage inner periphery of said hook portion from said counter engaging portion, and an outer periphery of said hook portion is formed in a configuration having a slope shape relative to a moving track of said counter engaging portion in such a manner that, while said driving portion is in non-driving condition, said outer periphery of said hook portion is structured to be located on the movement track on which said counter engaging portion moves while said roof panel is moving toward said fully closed state, and when said counter engaging portion contacts in this state, said engaging member rotates from said engaging position to said disengaging position by a pressing force thereof.

A vehicle equipped with an openable/closable roof panel as mentioned above keeps out wind and rain in bad weather by closing the roof panel to fully closed state. Therefore, it is necessary to provide such a measure that the roof panel brought into open state is at least brought to fully closed state for a case where said hooking mechanism or the like is broken down.

With above-mentioned configuration, in a case said hooking mechanism or the like is broken down, rotatable driving of said driving portion stops, said hook portion rotates in one rotating direction by biasing force of said biasing member, and outer periphery of the hook portion rotates up to a position on the track on which said counter engaging portion moves when the roof panel is brought into fully closed state. When the roof panel is brought from opened state to fully closed state under this state, said counter engaging portion contacts with the outer periphery of the hook portion. Since the outer periphery of the hook portion is in said inclined profile, said hook member is rotated in said other rotating direction (disengaging direction) by the pressing force of the counter engaging portion, and as a result, when the roof panel is brought into fully closed state, the counter engaging portion is positioned inside the hook portion and at the same time, the hook member rotates in said one rotating direction (engaging direction) by the biasing member, and the counter engaging portion and the hook portion engage each other.

In this way, even a case the hooking mechanism or the like is broken down, such a trouble that the roof panel can not be brought into fully closed state due to interference of the hook member and the counter engaging portion is prevented, and the roof panel can be brought into fully closed state.

In a sixth invention related to the second invention, said roof panel is structured to be stored in a roof panel storage portion formed at rear part of a vehicle when said vehicle cabin space is being opened, said counter engaging portion is provided to said rear connecting link member, said engaging member has a hook portion formed in a bent hook shape and is provided to the vehicle body rotatably between an engaging position and a disengaging position, and has a biasing member for biasing the engaging member in a direction from the disengaging position to the engaging position so as to engage an inner periphery of the hook portion with said counter engaging portion, and a counter contacting portion for being contacted by said front connecting link member when said roof panel is being stored in said roof panel storage portion, said driving portion is structured to rotate the engaging member from the engaging position to the disengaging position against biasing force of the biasing member so as to disengage inner periphery of said hook portion from said counter engaging portion, and said front connecting link member has a contacting portion for contacting said counter contacting portion of said engaging member, and causes the contacting portion to contact the counter contacting portion when said roof panel is stored in the roof panel storage portion to rotate the counter engaging member against biasing force of said biasing member up to a position where the counter engaging member is not visible being hidden by the vehicle body in side elevation and to hold the same at that position.

With above-mentioned configuration, it is preferable from viewpoint of beauty that link restricting mechanism or the like are disposed so as not to be viewed. Specifically, when the roof panel is in opened state, these members including the link mechanism should be treated suitably because the vehicle body is easy to be viewed from outside.

In view of the foregoing, said hook member is configured not to be viewed from outside the vehicle body while the roof panel is in opened state. Particularly, said counter contacting portion is provided to the hook member, and said contacting portion is provided to the front connecting link member. Therefore, as the roof panel is stored in said roof panel storage room, the contacting portion of said front connecting link member and the counter contacting portion of the hook member make contact, and the front connecting link member causes the hook member to rotate together with the contacting portion and the counter contacting portion in contact with each other to make the hook member rotated until the hook member is hidden behind vehicle body in side elevation view. As a result, when the roof panel is stored in the roof panel storage room, the hook member is not viewed from outside the vehicle body in side elevation view, thereby improving beauty in roof panel opened state.

Advantages of the Invention

According to the present invention, rigidity of the link mechanism when the roof panel is in fully closed state can be improved because one of said front and rear connecting link members, each rotatably connected to said roof panel and vehicle body is restricted to vehicle body by said link restricting mechanism so that the link mechanism can not rotate relative to the vehicle body and roof panel. As a result, lifting of the roof panel in fully closed state can be prevented.

BRIEF DESCRIPTION OF THE DRAWINGS

FIG. 15 is a schematic side view showing the roof panel opening/closing device when the roof panel is locked in the trunk room and is in stored state.

DESCRIPTION OF REFERENCE NUMERALS

Figure 1:
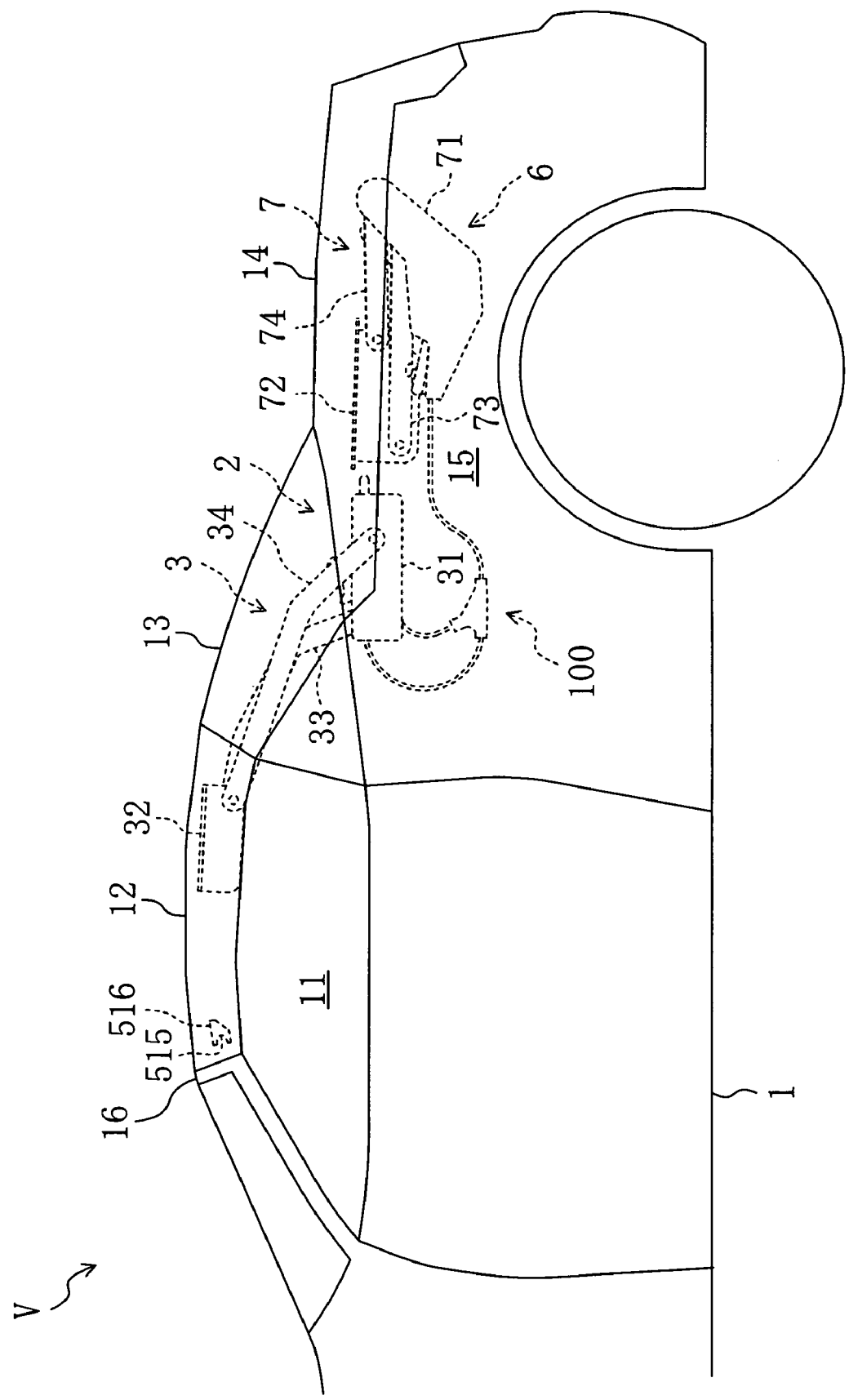
FIG. 1 is a schematic side view showing a vehicle employing an opening/closing device of a panel member relating to an embodiment of the present invention, in which a roof panel and a trunk lid are in fully closed state.

C3 circumference
T moving track (track)
1 vehicle body
11 vehicle cabin space
12 roof panel
15 trunk room (roof panel storage portion)
3 link mechanism
33 front connecting link (front connecting link member)
33b contacting bracket (contacting portion)
34 rear connecting link (rear connecting link member)
500 link restricting mechanism
501 hook member (engaging member)
501a hook portion
501b inner periphery
501d outer periphery
502 biasing spring (biasing member)
503 first driving cable (driving portion)
504 engaging pin (counter engaging portion)
505 contacting pin (counter contacting portion)

BEST MODE FOR CARRYING OUT THE INVENTION

Referring now to the drawings, the embodiment of the present invention will be explained hereafter in detail.

For simplicity of explanation, in the explanation of the embodiment, front side of the vehicle is referred to as "front", rear side of the vehicle is referred to as "rear", left side of vehicle width direction is referred to as "left", and right side of vehicle width direction is referred to as "right".

FIG. 1 shows vehicle V having a trunk lid relating to the embodiment of the present invention. Reference numeral 12 is a roof panel provided to the vehicle body 1, reference numeral 13 is a back window panel provided to the vehicle body 1, and reference numeral 14 is a trunk lid for opening/closing a trunk room 15 being formed to vehicle rear part of the vehicle body 1.

Figure 3:
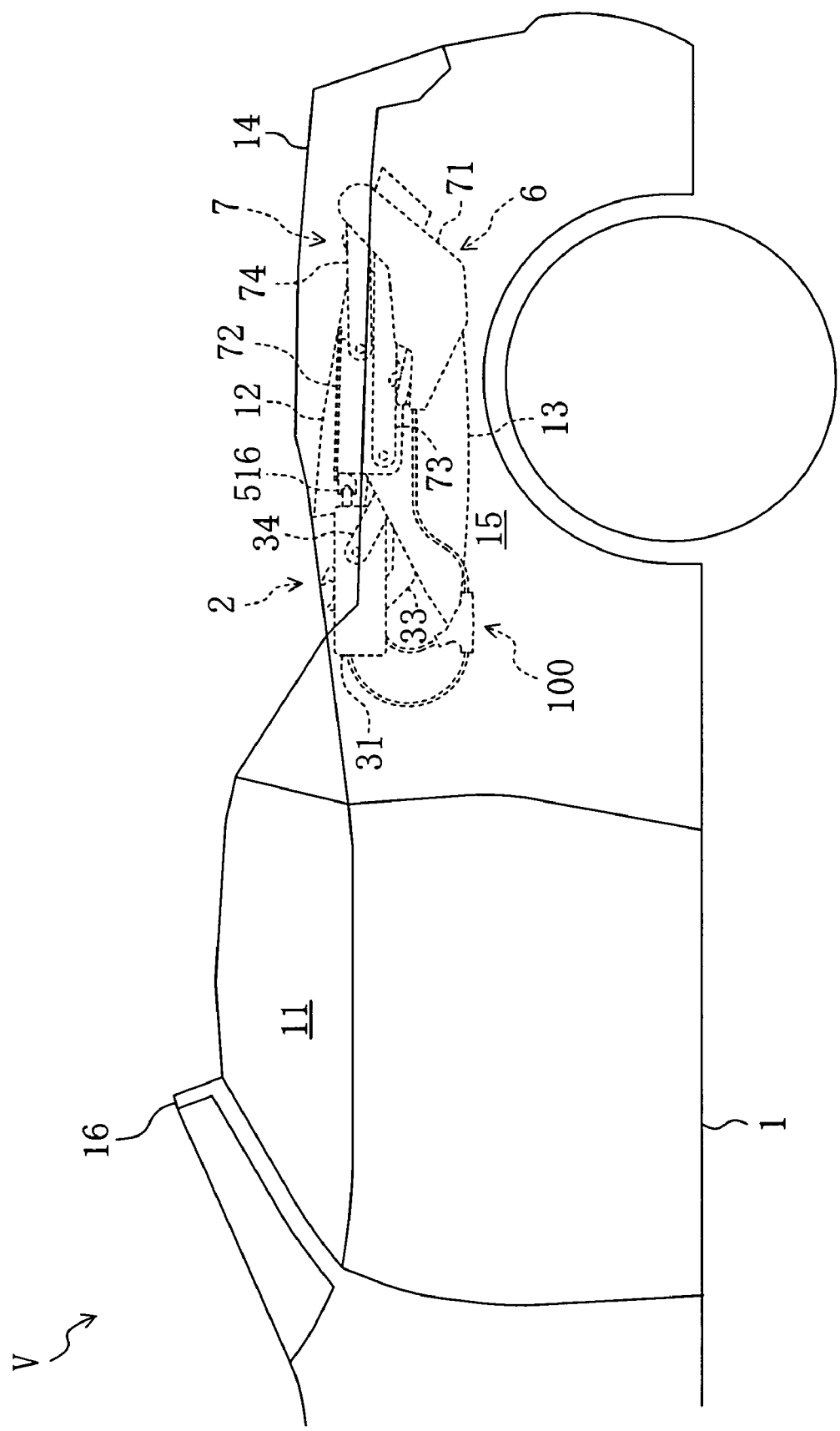
FIG. 3 is a schematic side view showing the vehicle in which the roof panel and the trunk lid are in stored state.

Said roof panel 12 and the back window panel 13 are configured to be openable/closable by a roof panel opening/closing device 2 between fully closed state where a vehicle cabin space 11 of the vehicle body 1 is closed as shown in FIG. 1 and stored state (fully opened state) stored in a trunk room 15 provided to vehicle body rear part as shown in FIG. 3. In the present embodiment, the trunk room 15 corresponds to the roof panel storage portion. However, a roof panel storage portion for storing the roof panel 12 and the back window panel 13 may be provided separately from the trunk room 15.

Further, said trunk lid 14 is configured to be openable/closable between fully closed state where the trunk room 15 is closed and fully opened where the trunk room 15 is made open by a trunk lid opening/closing device 6. This trunk lid 14 performs opening/closing operation being interlocked with opening/closing operation of said roof panel 12 and the back window panel 13. That is, when said roof panel 12 and the back window panel 13 are in fully closed state or stored state, the trunk lid 14 is in fully closed state (see FIGS. 1 and 3), while when said roof panel 12 and the back window panel 13 are performing opening/closing operation from fully closed state to stored state, or performing opening/closing operation in reverse direction, it is in a state where the trunk room 15 is made open (see FIG. 2).

<Trunk Lid Opening/Closing Device>

First, the trunk lid opening/closing device 6 will be explained. Although the trunk lid opening/closing device 6 is provided at both right and left side with respect to the trunk lid 14, their configuration is identical, and therefore, explanation will be given for the trunk lid opening/closing device 6 at the left referring to FIG. 4 to FIG. 8.

The trunk rind opening/closing device 6 includes a link mechanism 7 for connecting the trunk lid 14 and the vehicle body 1, a locking mechanism 8 for holding the trunk lid 14 in fully closed state, an electric motor 10 (not shown in FIGS. 5 to 7) for driving the link mechanism 7 and the locking mechanism 8, and a transmitting mechanism 9 for transmitting a driving force of the electric motor 10 to the link mechanism 7, causes the trunk lid 14 to perform opening/closing operation between fully closed state and fully opened state, and at the same time, holds the trunk lid 14 to the vehicle body in fully closed state.

Said link mechanism 7 includes a base bracket 71 provided to the vehicle body 1, a lid side bracket 72 provided to the trunk lid 14, and a front connecting link 73 and a rear connecting link 74 for connecting the base bracket 71 and the lid side bracket 72.

Said base bracket 71 includes mounting brackets 71a, 71a, . . . , and these mounting brackets 71a, 71a, . . . are attached to the side body of the vehicle body 1 from the inside of the vehicle cabin.

Lid side end of said front connecting link 73 is rotatably connected to the lid side bracket 72 and vehicle side end of said front connecting link 73 is rotatably connected to the base bracket 71. Further, lid side end of said rear connecting link 74 is rotatably connected to the lid side bracket 72 and vehicle side end of said rear connecting link 74 is rotatably connected to the base bracket 71 at backward position than the front connecting link member 73.

In this way, the base bracket 71, the lid side bracket 72, the front connecting link member 73, and rear connecting link 74 constitute so-called four-jointed link mechanism, and rotation of the front connecting link member 73 and the rear connecting link 74 about each of vehicle side end causes the trunk lid 14 to perform opening/closing operation.

Said transmitting mechanism 9 includes a driving link 91 one end of which is connected to said rear connecting link 74, a sector gear 92 rotatably driven being connected to the electric motor 10, and a connecting pin 93 for connecting other end of the driving link 91 and the sector gear 92, and is so composed that transmitting state where driving force of the electric motor 10 is transmitted to the link mechanism 7 and non-transmitting state where the driving force is not transmitted to the link mechanism 7 are switchable.

One end of said driving link 91 is rotatably connected to said rear connecting link 74 at a connection portion 91a, while to other end is penetrated an inserting hole 91b (see FIG. 8) through which said connecting pin 93 is passed.

To said sector gear 92 are integrally formed a gear portion 92a mating with an output gear (not shown) provided to an output shaft of said electric motor 10 and a connection portion 92b to which other end of said driving link 91 is connected. Said gear portion 92a has gear ratio to reduce driving force of the electric motor 10 with respect to the output gear, i.e., the sector gear 92 functions also as a reduction gear. To said connection portion 92b is penetrated a fitting hole 92c in oblong shape extending in radial direction with respect to center of rotation of the sector gear 92.

Then, by fitting the connecting pin 93 passed through the inserting hole 91b of said driving link 91 into the fitting hole 92c of said sector gear 92, the driving link 91 is rotatably connected to the sector gear 92 and is displaceably connected in the direction of extension of the oblong hole of the fitting hole 92c. Although the connecting pin 93 is rotatably provided to the driving link 91 by insertion through the inserting hole 91b of the driving link 91, the connecting pin 93 may be fixed to the driving link 91 by welding. Further, the fitting hole 92c need not be penetrated necessarily, and any configuration with closed bottom may be used as long as the connecting pin 93 can be fit thereto.

Figure 8:
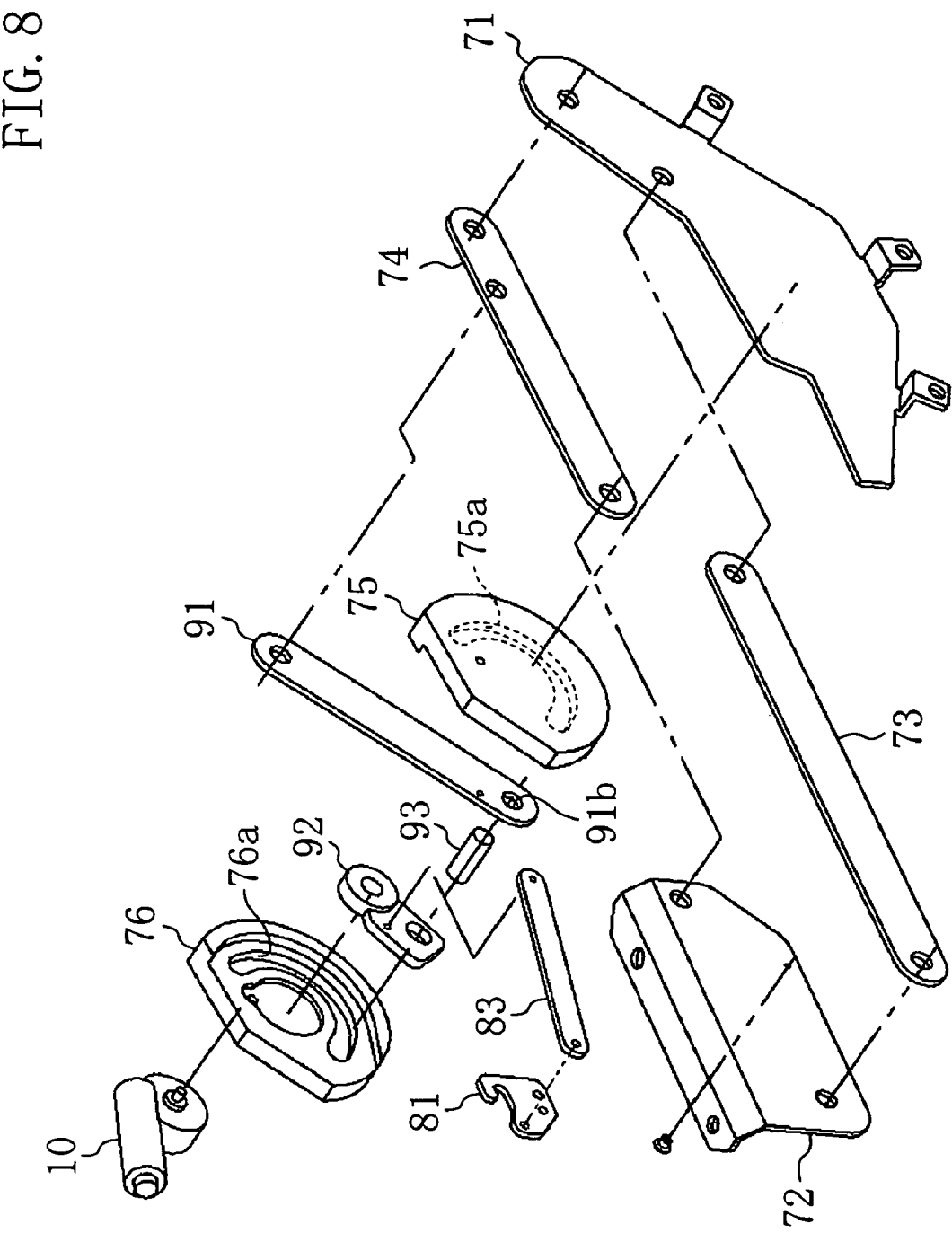
FIG. 8 is an exploded perspective view showing the trunk lid opening/closing device.

The driving link 91 and the sector gear 92 connected via the connecting pin 93 are grasped by a guide outer 75 (shown in FIG. 8 only) and a guide inner 76 (shown in FIG. 8 only) provided oppositely each other as shown in FIG. 8. When the guide outer 75 is provided to the base bracket 71, the driving link 91, the sector gear 92, the connecting pin 93 or the like are then provided to the base bracket 71.

Here, an outer guide groove 75a is formed to said guide outer 75, and at the same time, an inner guide groove 76a having identical profile of the outer guide groove 75a as opposed thereto is formed to the guide inner 76. A pair of the outer guide groove 75a and the inner guide groove 76a constitutes one guide portion 94. Meanwhile, the outer guide groove 75a and the inner guide groove 76a have a groove width which is identical to or slightly broader than the outside diameter of the connecting pin 93 and allows fitting of the connecting pin 93 in the groove 76a.

Specifically, when said driving link 91 and the sector gear 92 are grasped by the guide outer 75 and the guide inner 76, the sector gear 92 is rotatably supported with respect to the guide outer 75 and the guide inner 76 and at the same time, each of both ends of the connecting pin 93 penetrating through the driving link 91 and the sector gear 92 is engaged with the outer guide groove 75a and the inner guide groove 76a. Further, the electric motor 10 is mounted to the guide inner 76 so that an output gear of the output shaft thereof mates with the gear portion 92a of the sector gear 92. Meanwhile, to the connection portion 92b of the sector gear 92 is connected a lock transmitting link 83, which will be dealt with later, in addition to said driving link 91.

With the transmitting mechanism 9 thus composed, when the sector gear 92 is rotatably driven by the electric motor 10, the driving link 91 connected to the sector gear 92 by the connecting pin 93 is driven. On this occasion, since the connecting pin 93 is engaged with the guide portion 94, the driving link 91 is driven while the connecting pin 93 is being guided by the guide portion 94.

Profile of said guide portion 94 will be explained in detail. The guide portion 94 (outer guide groove 75a and inner guide groove 76a) has a curved shape from one end located at front lower side to other end located at rear upper side, and a non-transmitting guide portion 94a for not transmitting the driving force of the electric motor 10 to the link mechanism 7 and a transmitting guide portion 94b for transmitting the driving force of the electric motor 10 to the link mechanism 7 are continuous with each other at a switching point 94c.

Figure 4:
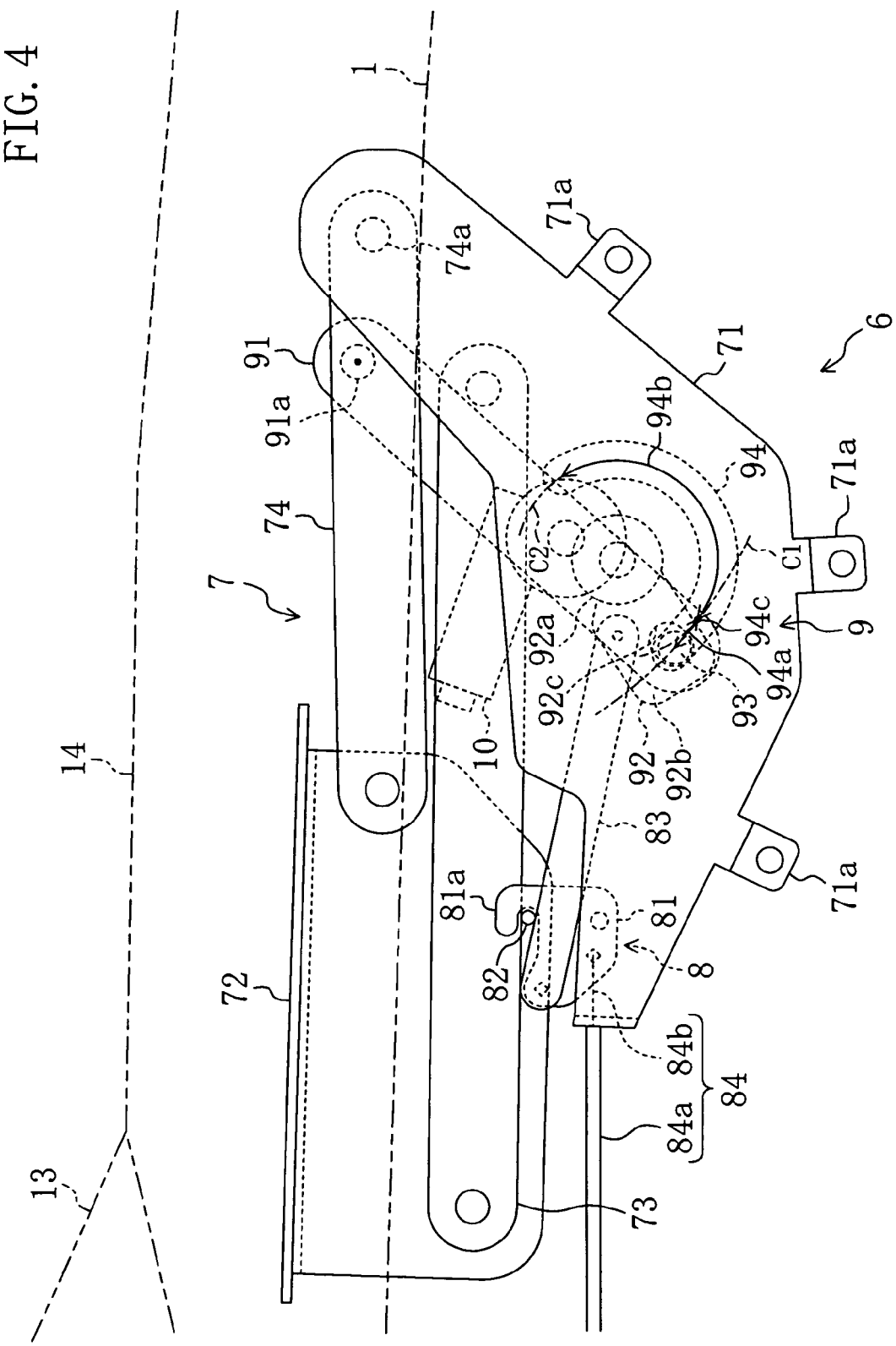
FIG. 4 is a schematic side view showing a trunk lid opening/closing device when the trunk lid is locked in fully close state.
Figure 5:
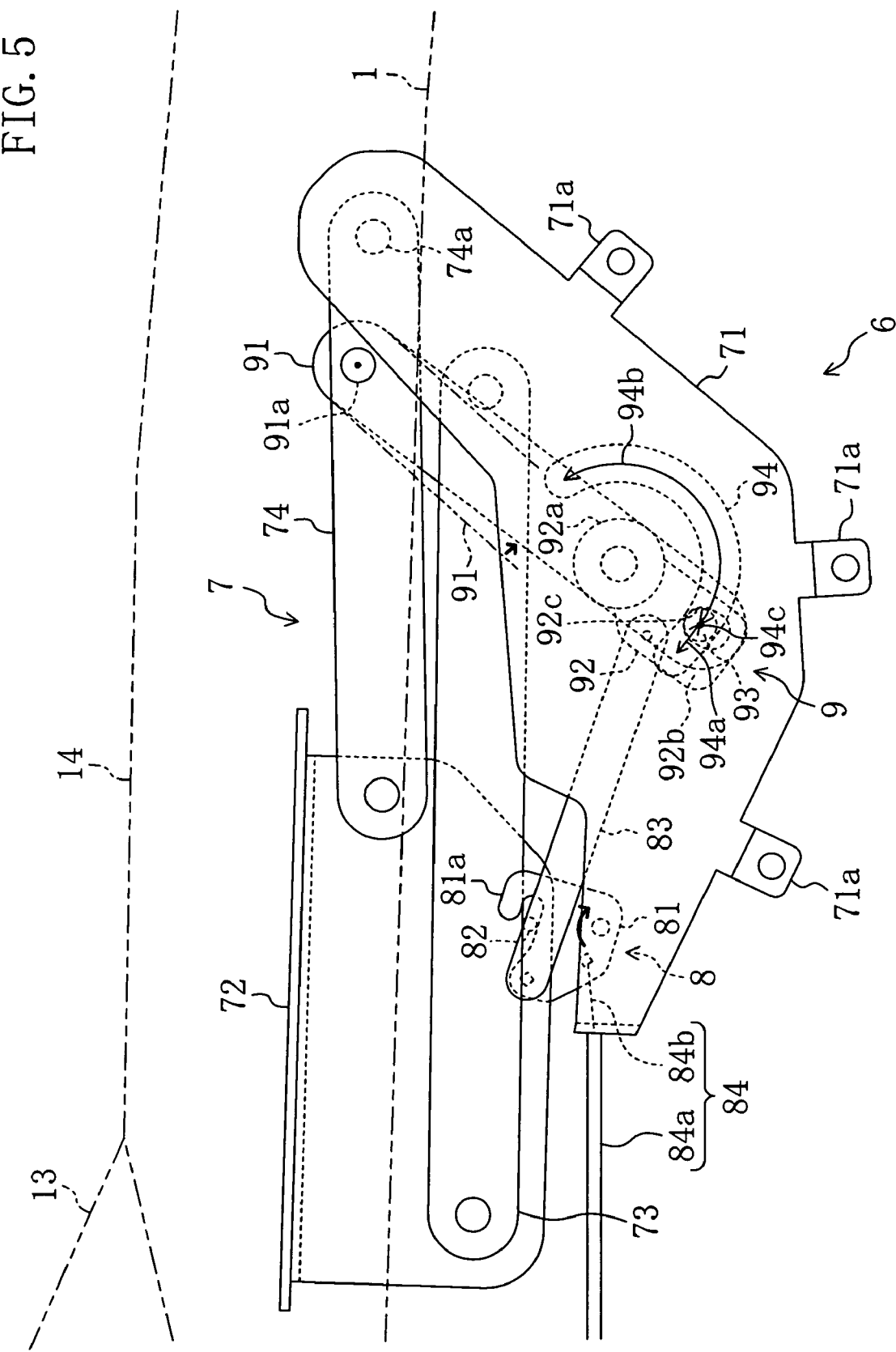
FIG. 5 is a schematic side view showing the trunk lid opening/closing device when the trunk lid is lock released in fully close state.

Said non-transmitting guide portion 94a is formed between one end at front lower side and the switching point 94c, and forms an arc C1 (shown in FIG. 4 only) which is drawn around the connection portion 91a in the fully closed state of trunk lid 14, to which the driving link 91 and the rear connecting link 74 are connected, and passes the connecting pin 93. In other words, when the connecting pin 93 is guided along the non-transmitting guide portion 94a, the driving link 91 simply rotates about the connection portion 91a as shown in FIGS. 4, 5, while the connection portion 91a is not displaced. As a result, the rear connecting link 74 does not move and the trunk lid 14 remains motionless in fully closed state. That is, the transmitting mechanism 9 is in non-transmitting state where driving force of the electric motor 10 is not transmitted to the link mechanism 7 while the connecting pin 93 is guided along the non-transmitting guide portion 94a.

Figure 6:
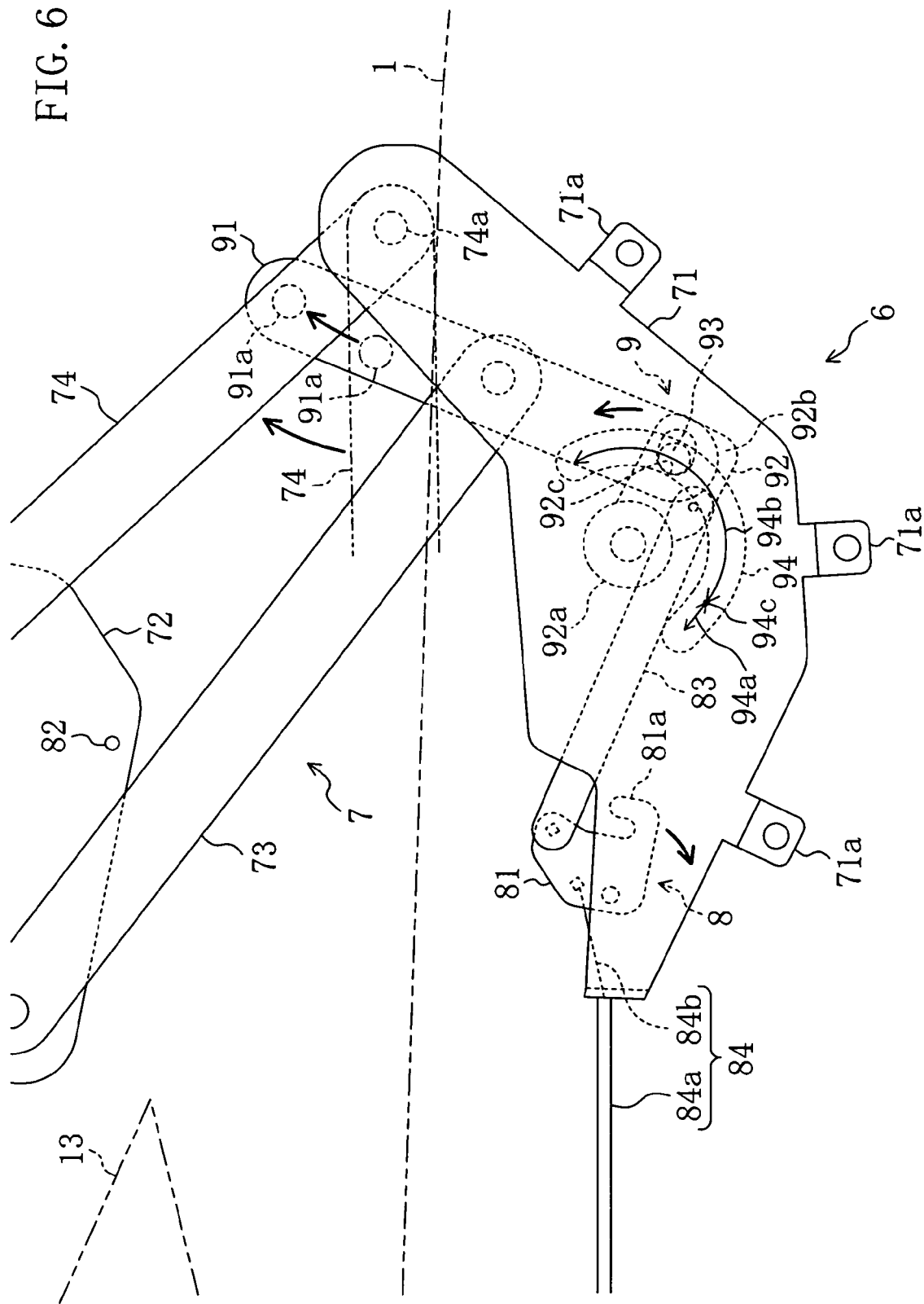
FIG. 6 is a schematic side view showing the trunk lid opening/closing device when the trunk lid is in opening/closing operation.

Said transmitting guide portion 94b is formed between the switching point 94c and other end at rear upper side, and has a profile of arc C2 (shown in FIG. 4 only) passing on the connecting pin 93 while rotation center of the sector gear 92 is centered. In other words, when the connecting pin 93 is guided along the transmitting guide portion 94b, the driving link 91 moves so as to displace the connection portion 91a of the driving link 91 and the rear connecting link 74 as shown in FIG. 6, and causes the rear connecting link 74 to rotate about a vehicle side end 74a. As a result, the trunk lid 14 performs opening/closing operation by the link mechanism 7 (see FIGS. 1 to 3). That is, the transmitting mechanism 9 is in transmitting state for transmitting driving force of the electric motor 10 to the link mechanism 7 while guiding the connecting pin 93 along the transmitting guide portion 94b.

Said locking mechanism 8 includes, as shown in FIG. 4, a hook 81 rotatably provided to said base bracket 71, an engaging pin 82 provided to said lid side bracket 72 and engages with the hook 81, and the lock transmitting link 83 for transmitting driving force of the electric motor 10 to the hook 81, and holds the trunk lid 14 in fully closed state by engaging the hook 81 with the engaging pin 82 when the trunk lid 14 is in fully closed state.

A hook portion 81a engaging with said engaging pin 82 is formed to said hook 81.

One end of said lock transmitting link 83 is rotatably connected to the connection portion 92b of said sector gear 92 and other end is rotatably connected to said hook 81 to transmit rotating motion of the sector gear 92 to the hook 81. The lock transmitting link 83 causes the hook 81 to rotate in the direction engaging with the engaging pin 82 (counterclockwise in FIG. 4) when the sector gear 92 drives the connecting pin 93 from switching point 94c to one end side direction along non-transmitting guide portion 94a of the guide portion 94 (clockwise in FIG. 4), and causes the hook 81 to rotate in the direction disengaging from the engaging pin 82 (clockwise in FIG. 4) when the sector gear 92 drives the connecting pin 93 from one end side to the switching point 94c direction along non-transmitting guide portion 94a of the guide portion 94 (counterclockwise in FIG. 4). Meanwhile, when the sector gear 92 is guided the connecting pin 93 along the transmitting guide portion 94b of the guide portion 94, the hook 81 rotates in accordance with rotation of the sector gear 92 regardless of engagement of the engaging pin 82.

Further, to the hook 81 is provided an input end of an inner cable 84b of an input cable 84 which will be dealt with later.

Operations of the trunk lid 14 and the locking mechanism 8 driven by the trunk lid opening/closing device 6 thus composed will be explained hereafter.

First, when the trunk lid 14 is in fully closed state, the connecting pin 93 is, as shown in FIG. 4, located at one end of front lower side of the non-transmitting guide portion 94a of the guide portion 94. Since one end of the non-transmitting guide portion 94a side of the guide portion 94 is located at farthest position from center of rotation of the sector gear 92 in the guide portion 94, the connecting pin 93 is located at outer end of the fitting hole 92c.

In the meantime, the hook portion 81a of the hook 81 is engaged with the engaging pin 82 of the lid side bracket 72, thereby holding the trunk lid 14 in fully closed state.

When the sector gear 92 is turned counterclockwise by driving the electric motor 10 from this state, as shown in FIG. 5, the connecting pin 93 moves the non-transmitting guide portion 94a of the guide portion 94 from one end side to the switching point 94c side in accordance with rotation of the sector gear 92. Since this non-transmitting guide portion 94a has arc C1 profile around the connection portion 91a of the driving link 91 and the rear connecting link 74 when the trunk lid 14 is fully closed, the driving link 91 simply rotates about the connection portion 91a as long as the connecting pin 93 is being guided to the non-transmitting guide portion 94a. In other words, since the connection portion 91a does not displace, the rear connecting link 74 does not move, and the trunk lid 14 remains motionless in fully closed state. Further, since a distance between the non-transmitting guide portion 94a and rotation center of the sector gear 92 becomes shorter as it comes closer to the switching point 94c, the connecting pin 93 moves relatively in the fitting hole 92c from outer end side to inner end side as the connecting pin 93 moves along the non-transmitting guide portion 94a toward the transmitting guide portion 94b. When the connecting pin 93 reaches the switching point 94c, the connecting pin 93 will be located at inner end of the fitting hole 92c.

In the meantime, the hook 81 starts rotation from a state where the hook portion 81a is engaged with the engaging pin 82 to disengaging direction, and when the connecting pin 93 comes to the position of the switching point 94c of the guide portion 94, engagement with the engaging pin 82 is completely released. That is, the locking mechanism 8 performs unlocking operation when the transmitting mechanism 9 is in non-transmitting state.

When the sector gear 92 is further driven counterclockwise by driving the electric motor 10, as shown in FIG. 6, the connecting pin 93 will be guided along the transmitting guide portion 94b of the guide portion 94. Then, the connecting pin 93 moves being deviated from the arc C1 profile about said connection portion 91a, and therefore, the driving link 91 not only rotates about the connection portion 91a, but also moves to displace the connection portion 91a upwardly. As a result, the rear connecting link 74 rotates about the vehicle side end 74a and accordingly, the trunk lid 14 starts opening. On this occasion, the trunk lid 14 is able to perform opening/closing operation since the locking mechanism 8 is in unlocked state.

Meanwhile, engagement of the hook 81 with the engaging pin 82 is already released and it further rotates in the engagement releasing direction in accordance with rotation of the sector gear 92 regardless of engagement with the engaging pin 82.

Figure 2:
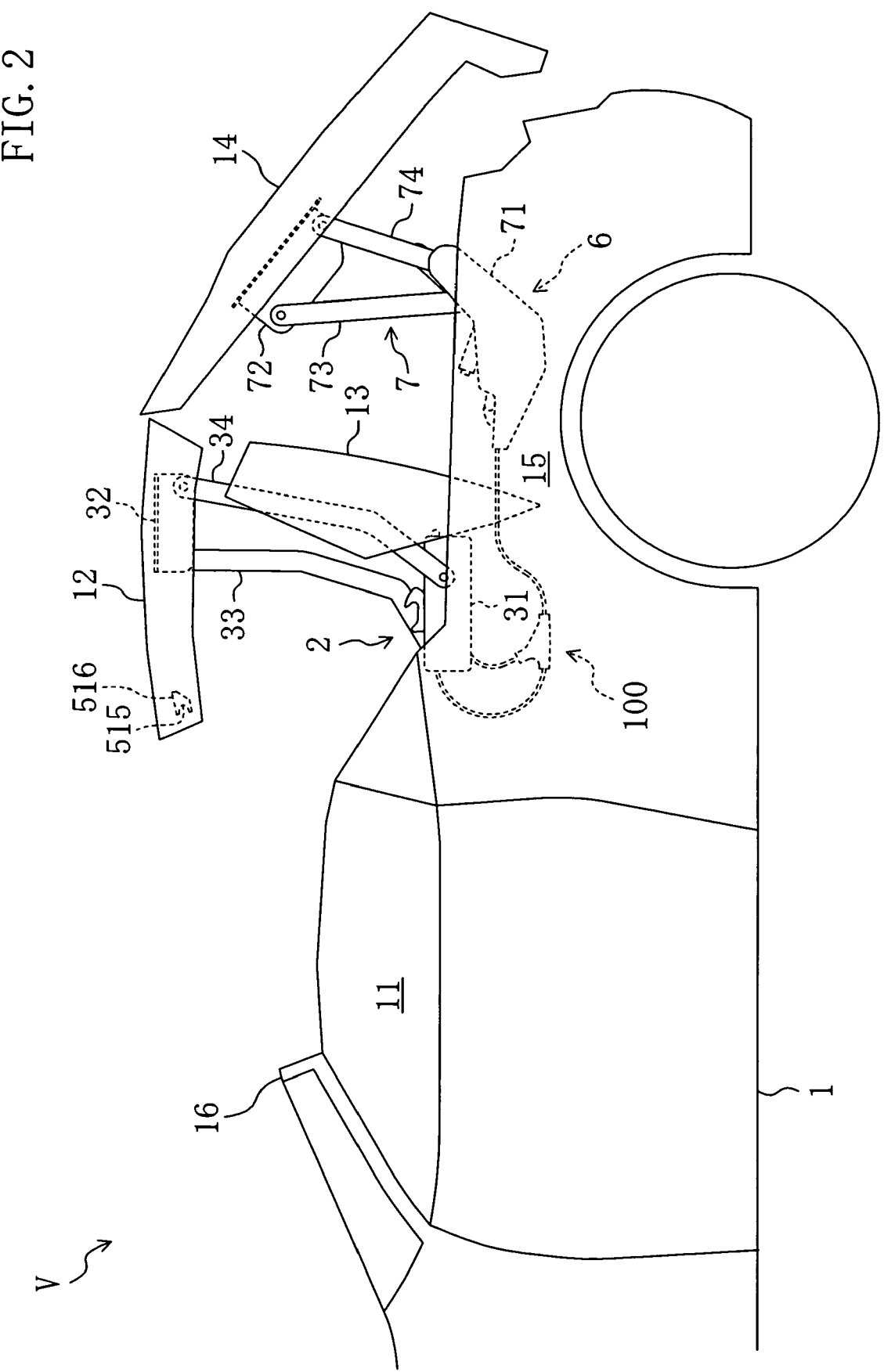
FIG. 2 is a schematic side view showing the vehicle in which the roof panel and the trunk lid are in opening/closing operation.
Figure 7:
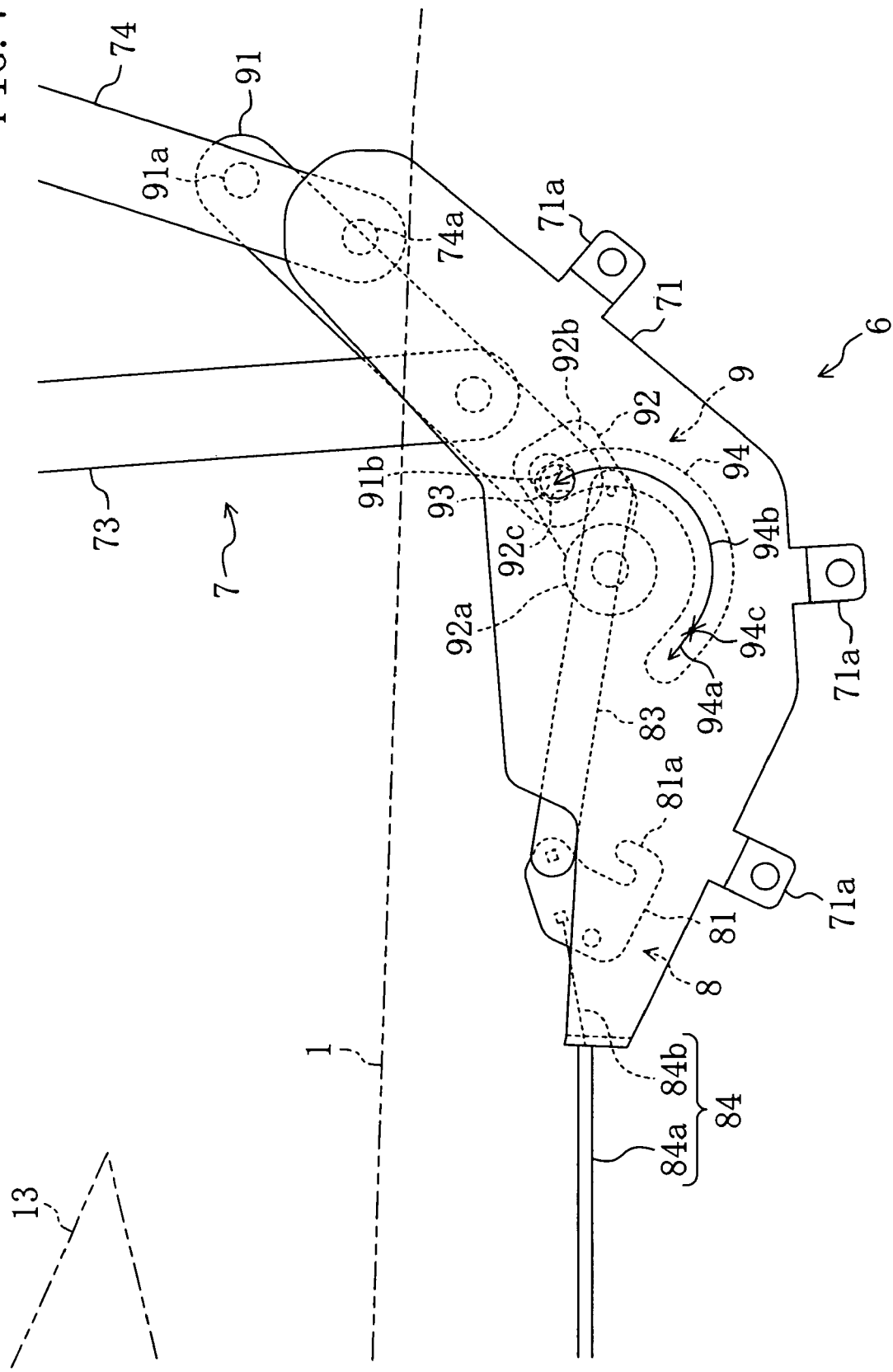
FIG. 7 is a schematic side view showing the trunk lid opening/closing device when the trunk lid is in fully opened state.

When the connecting pin 93 finally moves to other end of rear upper side in the transmitting guide portion 94b of the guide portion 94 as shown in FIG. 7, the trunk lid 14 is brought into fully opened state (see FIG. 2).

Contrary, when the trunk lid 14 is brought from fully opened state to fully closed state, the operation from fully closed state to fully opened state as mentioned above is reversed.

First, the electric motor 10 is driven in the reverse direction (clockwise in the figure) of the direction when the trunk lid 14 is brought into fully opened state. The connecting pin 93 then moves on the transmitting guide portion 94b from other end side to switching point 94c side. The driving link 91 displaces the connection portion 91a in accordance with movement of the connecting pin 93, and rotates the rear connecting link 74 about the vehicle side end 74a in the direction to close the trunk lid 14. As a result, the trunk lid 14 starts closing.

When the connecting pin 93 arrives at the switching point 94c of the guide portion 94, the trunk lid 14 is in fully closed state where the trunk room 15 is fully closed (see FIG. 5).

After that, when the connecting pin 93 passes the switching point 94c and moves along the non-transmitting guide portion 94a from switching point 94c side to one end side, i.e., when the transmitting mechanism 9 is in non-transmitting state, the hook portion 81a of said hook 81 starts engagement with the engaging pin 82. When the connecting pin 93 reach one end of the non-transmitting guide portion 94a, the hook portion 81a of said hook 81 is fully engaged with the engaging pin 82 to become locked state. As mentioned above, the driving link 91 simply rotates about the connection portion 91a as long as the connecting pin 93 is moving along the non-transmitting guide portion 94a and the connection portion 91a is not displaced, and therefore, the trunk lid 14 remains motionless in fully closed state. That is, the locking mechanism 8 performs locking operation while the transmitting mechanism 9 is in non-transmitting state.

In this way, when the connecting pin 93 is moved along the non-transmitting guide portion 94*a*, the trunk rind opening/closing device 6 drives the locking mechanism 8 while the trunk lid 14 remains motionless to cause locking or unlocking operation. When the connecting pin 93 is moved along the transmitting guide portion 94*b*, it causes the trunk lid 14 to perform opening/closing operation.

<Roof Panel Opening/Closing Device>

Next, the roof panel opening/closing device 2 will be explained. The roof panel opening/closing device 2 is provided at both right and left side with respect to the roof panel 12 and the back window panel 13 and their configuration is identical, and therefore, explanation will be given for the roof panel opening/closing device 2 at the left referring to FIG. 9 to FIG. 15.

Figure 9:
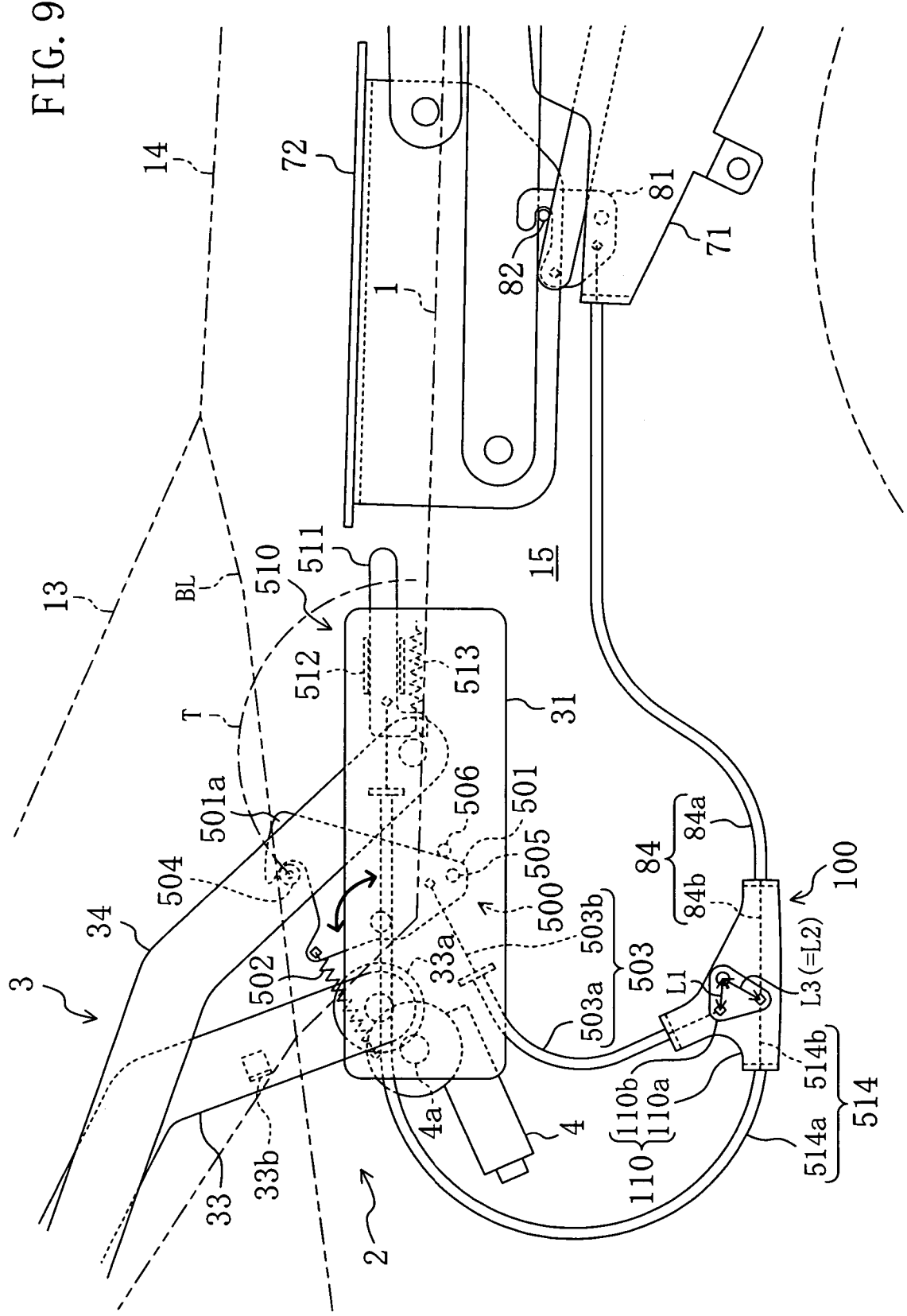
FIG. 9 is a schematic side view showing the roof panel opening/closing device when the roof panel is locked in fully closed state.

The roof panel opening/closing device 2 includes, as shown in FIG. 9, the link mechanism 3 for connecting the roof panel 12, the back window panel 13, and vehicle body 1 (see FIG. 1), the electric motor 4 (shown in FIG. 9 only) for driving the link mechanism 3, a link restricting mechanism 500 for restricting the link mechanism 3 when the roof panel 12 and the back window panel 13 are in fully closed state, and a stored state locking mechanism 510 for holding the roof panel 12 when the roof panel 12 and the back window panel 13 are in stored state. The roof panel opening/closing device 2 causes the roof panel 12 and the back window panel 13 to perform opening/closing operation between fully closed state and stored state, restricts the link mechanism 3 in the fully closed state, and at the same time, holds the roof panel 12 in the stored state.

A sealing material (not shown) is provided at periphery of said roof panel 12 and the back window panel 13 in order to maintain air tightness of the vehicle cabin space 11 in fully closed state.

Said link mechanism 3 includes, as shown in FIGS. 1 to 3, a base bracket 31 provided to the vehicle body 1, a panel side bracket 32 provided to the roof panel 12, and the front connecting link 33 and the rear connecting link 34 for connecting the base bracket 31 and the panel side bracket 32.

A panel side end of said front connecting link 33 is rotatably connected to the panel side bracket 32 and a vehicle body side end of said front connecting link 33 is rotatably connected to the base bracket 31. Further, a panel side end of said rear connecting link 34 is rotatably connected to the panel side bracket 32 and a vehicle body side end of said rear connecting link 34 is rotatably connected to the base bracket 31 at backward position than the front connecting link member 33. The back window panel 13 is provided to the rear connecting link 34.

In this way, the base bracket 31, the panel side bracket 32, the front connecting link 33, and the rear connecting link 34 constitute so-called four-jointed link mechanism.

Said electric motor 14 is, as shown in FIG. 9, provided to vehicle body side end of the front connecting link 33. Specifically, a reduction gear 33*a* is provided to the vehicle body side end of the front connecting link 33, and the electric motor 4 is provided to said base bracket 31 in such that an output gear 4*a* provided to the output shaft thereof mates with the reduction gear 33*a*. In this way, driving force of the electric motor 4 is reduced and transmitted to the front connecting link 33 to rotate the front connecting link 33 about vehicle body side end thereof. Thus the link mechanism 3 is driven to perform opening/closing operation of the roof panel 12 and the back window panel 13.

The following description explains opening/closing operation of the roof panel 12 and back window panel 13 (hereafter also referred to as roof panel 12 and the like). Since the roof panel 12 and the like are opened and closed being interlocked with opening/closing operation of the trunk lid 14, interlocking with the trunk lid 14 is also explained.

First, in fully closed state, as shown in FIG. 1, the front connecting link 33 and the rear connecting link 34 are inclined forward being overlapped each other in the side elevation, and the roof panel 12 and the like are in fully closed state where the vehicle cabin space 11 is closed. In this case, the roof panel 12 is held by a locking mechanism (not shown) with respect to a front header 16 while front edge portion is in contact with the front header 16. Further, rear edge portion of the roof panel 12 and front edge portion of the back window panel 13 are in contact via the sealing member.

In this case, the trunk lid 14 is also in fully closed state.

When said electric motor 4 is driven from this state, as shown in FIG. 2, the front connecting link 33 starts backward rotation, the roof panel 12 and the like starts backward rotation in accordance with this movement and open the vehicle cabin space 11. Since the roof panel 12 is mounted to the panel side bracket 32 and the back window panel 13 is mounted to the rear connecting link 34, as the panel side bracket 32 and the rear connecting link 34 are folded by rotation of the link mechanism 3, the back window panel 13 is being folded with respect to the roof panel 12.

On this occasion, the trunk lid 14 performs opening/closing operation in accordance with the movements of the roof panel 12 and the back window panel 13. In particular, as shown in FIG. 2, in order to avoid interference with opening/closing operation of the roof panel 12 and the like, when the roof panel 12 and the like move up to a position, where the roof panel 12 and the like are overlapped on opening/closing track of the trunk lid 14, the trunk lid 14 is in opened state up to a position where it does not interfere with opening/closing track of the roof panel 12 and the like.

Finally, as shown in FIG. 3, the front connecting link 33 and the rear connecting link 34 are inclined backward being overlapped each other in the side elevation, and are stored in the trunk room 15 while the roof panel 12 and the back window panel 13 are folded and overlapped up and down.

In this case, the trunk lid 14 is closed gradually following the roof panel 12 and the like being stored in the trunk room 15, and when the roof panel 12 and the like are stored entirely in the trunk room 15, the trunk room 15 is brought into fully closed state.

In contrast, when it is brought from stored state to fully closed state, above-mentioned opening/closing operation from fully closed state to stored state is reversed.

First, when opening of the trunk lid 14 is started, the roof panel 12 and the like start opening/closing operation towards fully closed state from the trunk room 15 inside. In this case, the trunk lid 14 opens so as not to interfere with the roof panel 12 and the like performing opening/closing operation towards fully closed state.

When the roof panel 12 and the like arrive at a position where the roof panel 12 does not overlap the opening/closing track of the trunk lid 14, the trunk lid 14 starts closing. Meanwhile, the roof panel 12 and the like continue movement towards fully closed state.

Finally, the roof panel 12 and the like and the trunk lid 14 are brought into fully closed state nearly simultaneously.

Subsequently, a mechanism for holding the roof panel 12 and the like will be explained.

With the roof panel 12 and the back window panel 13 thus composed, a front edge portion of the roof panel 12 is held by a locking mechanism to the front header 16 in fully closed state. However, when the vehicle is traveling, there is a possibility that they are lifted by uplifting force due to aerodynamic force or vibration. Even in stored state, there is a possibility that the roof panel 12 and the like jounce in the trunk room 15 due to vibrations. Several mechanisms are then required to hold the roof panel 12 and the like appropriately. In the present embodiment, the link restricting mechanism 500 for restricting movements of the link mechanism 3 in the fully closed state and the stored state locking mechanism 510 for holding the roof panel 12 in stored state are provided.

<Link Restricting Mechanism>

First, the link restricting mechanism 500 will be explained. The link restricting mechanism 500 is provided to each of the roof panel opening/closing device 2 provided at both right and left and their configuration is identical, and therefore, explanation will be given for left side link restricting mechanism 500.

The link restricting mechanism 500 is adapted to restrict movements of the link mechanism 3 when the roof panel 12 is in fully closed state and, as shown in FIG. 9, includes a hook member 501 rotatably provided with respect to the base bracket 31, a biasing spring 502 for biasing the hook member 501 from rear to front on upper side (counterclockwise in the figure, hereafter referred to as engagement direction), a first driving cable 503 for rotating the hook member 501 from front to rear on upper side against biasing force of the biasing spring 502 (clockwise in the figure, hereafter referred to as disengagement direction), and an engaging pin 504 provided to said rear connecting link 34 and engages with said hook member 501.

Since said engaging pin 504 is provided to said rear connecting link 34, it moves between fully closed position corresponding to the roof panel 12 is fully closed (position shown in FIG. 9) and stored position corresponding to the roof panel 12 is stored (position shown in FIGS. 14, 15) while drawing an arc-shaped moving track T, together with the rear connecting link 34 rotating when the roof panel 12 performs opening/closing operation.

To said hook member 501 is formed a hook portion 501a in hook shape, and an inner periphery 501b of the hook portion 501a (see FIGS. 10, 11) engages with the engaging pin 504 when the roof panel 12 is in fully closed state. To the hook member 501 is provided a contacting pin 505 contacting with a contacting bracket 33b provided to the front connecting link 33 when the roof panel 12 performs opening/closing operation so as to be brought into stored state, which will be explained in detail later.

The hook member 501 thus composed is rotated in engagement direction by biasing force of the biasing spring 502 by releasing the driving of said first driving cable 503 (non-driving), and the hook portion 501a is caused to engage with the engaging pin 504 when the roof panel 12 is in fully closed state. Meanwhile, engagement of the hook portion 501a and the engaging pin 504 is disengaged by rotating the hook member 501 in disengaging direction against biasing force of the biasing spring 502 by driving of the first driving cable 503.

Engagement of the hook member 501 and the engaging pin 504 thus obtained restricts the rear connecting link 34 with respect to the vehicle body 1, and the roof panel 12 is held in fully closed state by this configuration. In the present embodiment, the hook member 501 constitutes the engagement member, the biasing spring 502 constitutes the biasing member, the first driving cable 503 constitutes the driving portion, and the engaging pin 504 constitutes the counter engaging portion.

Figure 10:
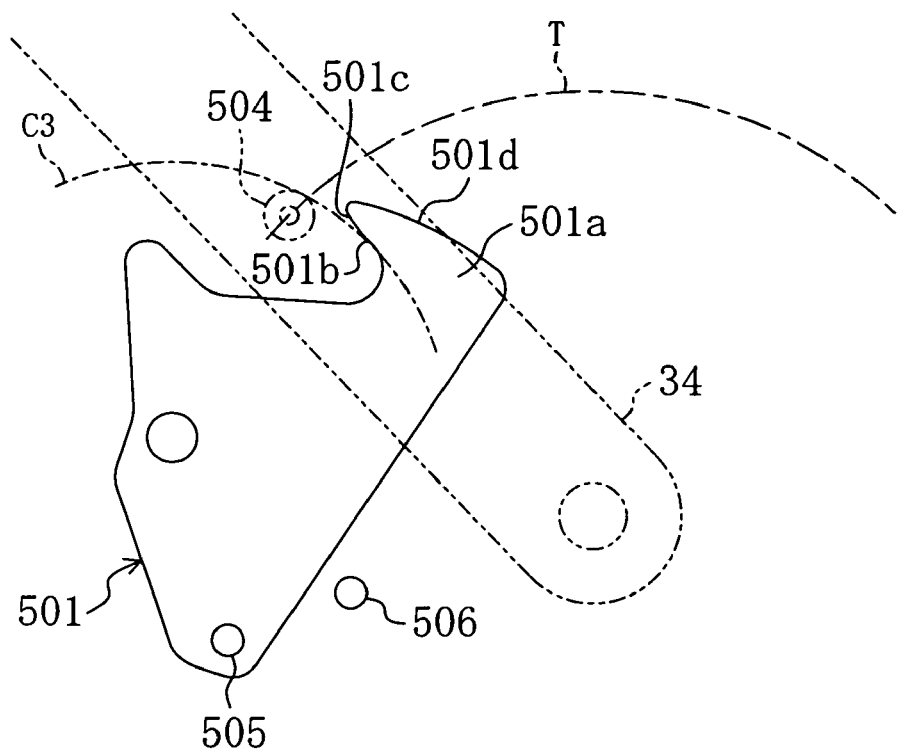
FIG. 10 is a schematic side view showing the profile of an inner periphery of a hook portion of a hook member.

The hook member 501 will be explained in detail hereafter. The inner periphery 501b of the hook portion 501a of said hook member 501 has such profile that, as shown in FIG. 10, a forefront portion 501c is opened to outside of a circumference C3 with respect to the circumference C3 passing on the hook portion 501a about rotation center of the hook member 501. With this configuration, even if the position of the engaging pin 504 is slightly shifted from original fully closed position when the roof panel 12 is fully closed state due to error at mounting the engaging pin 504 to the rear connecting link 34 or error of engaging pin 504 itself, the forefront portion 501c of the hook portion 501a reliably contacts the engaging pin 504 when the hook member 501 rotates in engagement direction, and the engaging pin 504 can be reliably engaged with the inner periphery 501b of the hook portion 501a.

Figure 11:
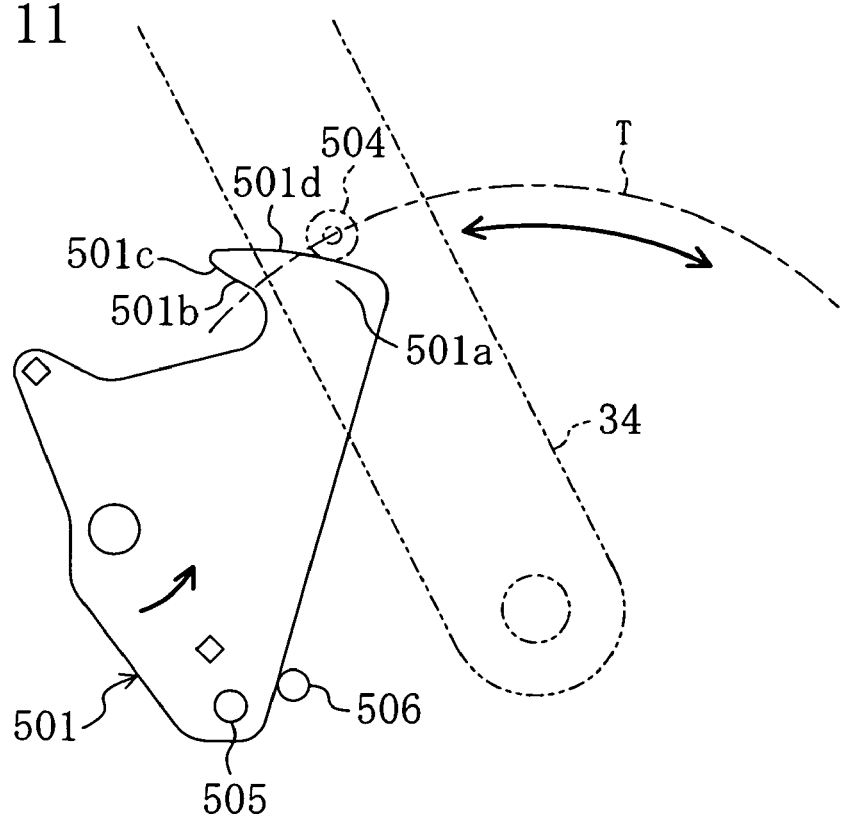
FIG. 11 is a schematic side view showing the profile of an outer periphery of the hook portion of the hook member.

Further, in an event the first driving cable 503 is disconnected by any chance, the hook member 501 rotates in engagement direction by biasing force of the biasing spring 502. However, as shown in FIG. 11, a stopper 506 contacting with the hook member 501 is provided so that hook member 501 stops at a stop position where an outer periphery 501d of the hook portion 501a is located on the movement track T of the engaging pin 504, and does not rotate further. The hook member 501 has an inclined profile so that, when it stops at said stop position, the outer periphery 501d of the hook portion 501a is inclined with respect to the movement track T of the engaging pin 504. In other words, forefront of the outer periphery 501d of the hook portion 501a is located outside the arc-shaped movement track T and is inclined with respect to the movement track T so that base end side thereof is located inside the arc-shaped movement track T.

That is, when the first driving cable 503 is disconnected, biasing force of the biasing spring 502 acts to the hook member 501 in engagement direction. If this disconnection occurs while the roof panel 12 is in fully closed state, engagement of the hook member 501 and the engaging pin 504 cannot be released, but the roof panel 12 can be maintained in fully closed state. Meanwhile, when the disconnection occurred while the roof panel 12 is in other than fully closed state (e.g., at stored), the hook member 501 rotates up to said stop position by biasing force of the biasing spring 502. When the roof panel 12 performs opening/closing operation towards fully closed state in this state, the engaging pin 504 rotating together with the rear connecting link 34 contacts the outer periphery 501d of the hook portion 501a. Since, in this case, the outer periphery 501d is inclined as mentioned above, a pressing force when the engaging pin 504 moves towards fully closed position (see FIG. 8) acts on the hook member 501 so as to rotate the hook member 501 in releasing direction. As a result, the engaging pin 504 moves to fully closed position along the movement track T in accordance with opening/closing operation of the roof panel 12 towards fully closed state while causing the hook member 501 to rotate in releasing direction. In this case, the engaging pin 504 moves relatively on the outer periphery 501d of the hook portion 501a from base end to forefront, and when a portion where engaging pin 504 contacts the hook portion 501a is shifted from the outer periphery 501d to the forefront portion 501c of the inner periphery, the hook member 501 starts rotation in engagement direction by biasing force of the biasing spring 502 and engages with the engaging pin 504 when the engaging pin 504 has moved to the fully closed position.

In this way, even if the first driving cable 503 is disconnected, with such a configuration that the hook member 501 is caused to rotate in releasing direction by pressing force of the engaging pin 504 moving towards fully closed state when the roof panel 12 is brought into fully closed state to allow engagement of the hook member 501 and the engaging pin 504, such a situation that the engaging pin 504 interferes with the hook member 501 when the roof panel 12 performs opening/closing operation towards fully closed state, and movement to fully closed state is not possible, can be prevented, thereby reliably bringing the roof panel 12 into fully closed state.

<Stored State Locking Mechanism>

Next, the stored state locking mechanism 510 will be explained. The stored state locking mechanism 510 is provided to each of the roof panel opening/closing device 2 provided at both right and left and their configuration is identical, and therefore, explanation will be given for left side stored state locking mechanism 510.

The stored state locking mechanism 510 is adapted to hold the roof panel 12 in the trunk room 15 when the roof panel 12 is stored, and includes, as shown in FIG. 9, an engaging bar 511 mounted to a leading guide 512 provided to the base bracket 31 and is capable of directly moving in fore and aft directions, a biasing spring 513 for biasing the engaging bar 511 backward, a second driving cable 514 for moving the engaging bar 511 forward against biasing force of the biasing spring 513, and a counter engaging member 516 (see FIGS. 1 to 3, 14, 15) to which is formed a counter engaging hole 515 to which said engaging bar 511 is engaged.

Figure 14:
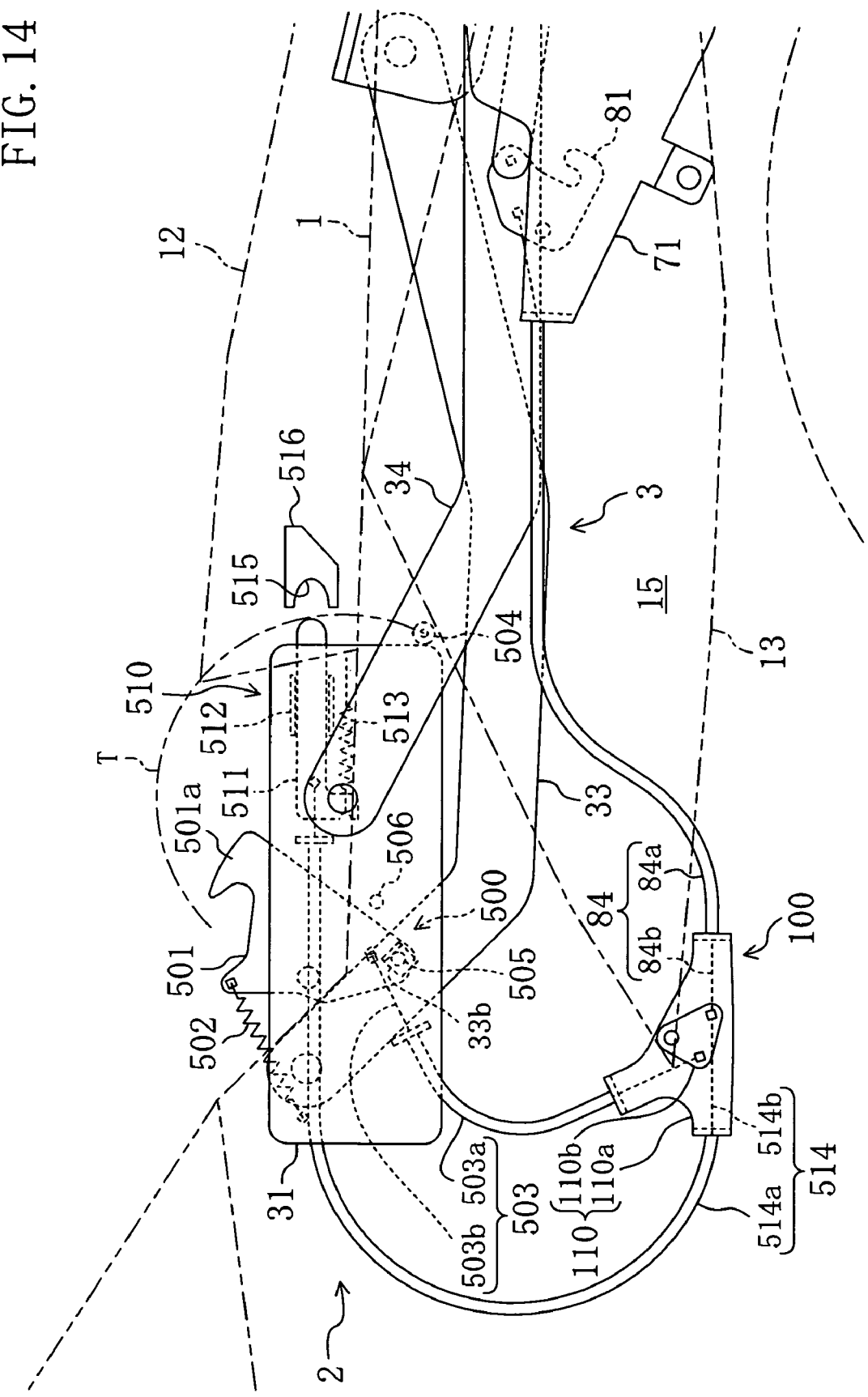
FIG. 14 is a schematic side view showing the roof panel opening/closing device when the roof panel is stored in a trunk room.

Said engaging bar 511 is provided so that forefront thereof protrudes in the trunk room 15 and at a position to be inserted to the counter engaging hole 515 of the counter engaging member 516 of the roof panel 12 in stored state (see FIGS. 14, 15).

Specifically, the engaging bar 511 is moved backward (inside of trunk room 15) by biasing force of the biasing spring 513 by releasing the driving of the second driving cable 514 (non-driving) to cause it to engage with the counter engaging hole 515 of the counter engaging member 516 of the roof panel 12 now in fully closed state. In the meantime, the engaging bar 511 is moved forward (outside of trunk room 15) against biasing force of the biasing spring 513 by driving the second driving cable 514 to release engagement of the engaging bar 511 and the counter engaging hole 515.

<Branched Driving Cable>

Said link restricting mechanism 500 and the stored state locking mechanism 510 are driven by the electric motor 10 via a branched driving cable 100.

The branched driving cable 100 includes, as shown in FIG. 9, an input cable 84 connected to said hook 81, the first driving cable 503 for driving said link restricting mechanism 500, the second driving cable 514 for driving said stored state locking mechanism 510, and a connecting member 110 for connecting the input cable 84, the first driving cable 503 and the second driving cable 514.

Said connecting member 110 is constituted by a fixing bracket 110a mounted to the vehicle body 1 and a connecting plate 110b rotatably provided to the fixing bracket 110a.

Said input cable 84 is constituted by an outer cable 84a and an inner cable 84b slidably provided in the outer cable 84a. Input end of the outer cable 84a is provided to said base bracket 71 and input end of the inner cable 84b is provided to the hook 81. Meanwhile, output end of the outer cable 84a is provided to said fixing bracket 110a and an output end of the inner cable 84b is attached to part of said connecting plate 110b away from the rotation center thereof by a predetermined third distance L3.

Said first driving cable 503 is constituted by an outer cable 503a and an inner cable 503b slidably provided in the outer cable 503a. Input end of the outer cable 503a is provided to the fixing bracket 110a and input end of the inner cable 503b is attached to part of said connecting plate 110b away from the rotation center thereof by a predetermined first distance L1. Meanwhile, output end of the outer cable 503a is provided to the base bracket 31 and at the same time, output end of the inner cable 503b is provided to hook member 501.

Said second driving cable 514 is constituted by an outer cable 514a and an inner cable 514b slidably provided in the outer cable 514a. Input end of the outer cable 514a is provided to the fixing bracket 110a and at the same time, input end of the inner cable 514b is attached to part of said connecting plate 110b away from the rotation center thereof by a predetermined second distance L2. In the meantime, output end of the outer cable 514a is provided to the base bracket 31 and at the same time, output end of the inner cable 514b is provided to the engaging bar 511. In the present embodiment, the inner cable 84b of said input cable 84 and the inner cable 514b of the second driving cable 514 are provided at the same position with respect to the connecting plate 110b, and therefore, the second distance L2 and the third distance L3 are identical.

Said hook 81 is driven by the electric motor 10 via the lock transmitting link 83 (see FIG. 4). That is, the link restricting mechanism 500 and the stored state locking mechanism 510 being driven by the branched driving cable 100 whose input end is provided to the hook 81 are driven by the electric motor 10.

The following description explains operations of the link restricting mechanism 500 and the stored state locking mechanism 510 being interlocked with operations of the hook 81.

First, when the roof panel 12 is in fully closed state, as shown in FIGS. 4, 9, the hook 81 is in a state engaged with the engaging pin 82 and the hook member 501 is in a state engaged with the engaging pin 504. Although the engaging bar 511 is in a state being moved backward, it is not functioning as a locking mechanism since the roof panel 12 is in fully closed state.

Figure 12:
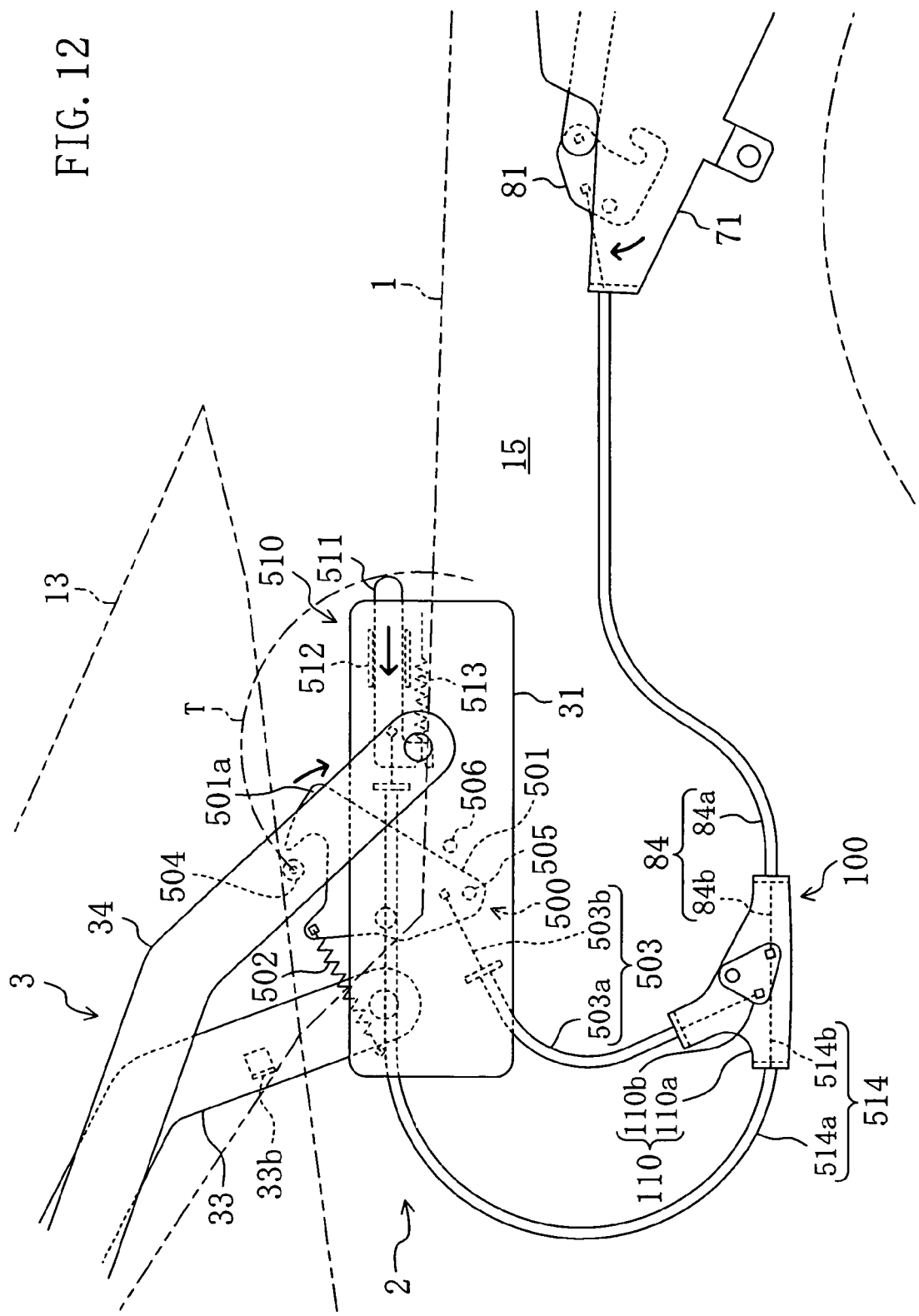
FIG. 12 is a schematic side view showing the roof panel opening/closing device when the roof panel is lock-released in fully closed state.

When the electric motor 10 is driven, from this state, in a direction for releasing engagement of the hook 81 and the engaging pin 82, as shown in FIG. 12, the inner cable 84b of the input cable 84 is being pulled in accordance with rotation of the hook 81.

When the inner cable 84b is pulled, the connecting plate 110b connected to output end thereof rotates in one direction (counterclockwise in FIG. 8), and when the connecting plate 110b rotates in one direction, the inner cable 503b of the first driving cable 503 and the inner cable 514b of the second driving cable 514 are pulled. As a result, the first driving cable 503 causes the hook member 501 to rotate in releasing direction, thereby releasing the engagement of the hook member 501 and the engaging pin 504. Further, as mentioned above, although the stored state locking mechanism 510 does not function as the locking mechanism while the roof panel 12 is in closed state, the engaging bar 511 moves forward since the second driving cable 514 is pulled.

In this way, a pulling force accompanied by rotation of the hook 81 is transmitted to the link restricting mechanism 500 and the stored state locking mechanism 510 via the branched driving cable 100. Here, since input end of the inner cable 503b of the first driving cable 503 and input end of the inner cable 514b of the second driving cable 514 are attached to part of the connecting plate 110b away from rotation center thereof by the first distance L1 and the second distance L2, respectively, the pulling force being input from the input cable 84 is transmitted to the first driving cable 503 and the second driving cable 514 being distributed with a ratio of L1:L2. Further, from viewpoint of stroke volume, since input end of the inner cable 503b of the first driving cable 503, input end of the inner cable 514b of the second driving cable 514, and output end of the inner cable 84b of the input cable 84 are attached to part of the connecting plate 110b away from rotation center thereof by the first distance L1, second distance L2, and third distance L3, respectively, stroke volume input to the input cable 84 (i.e., amount the inner cable 84b is pulled) is multiplied (L1/L3) times and transmitted to the first driving cable 503, and multiplied (L2/L3) times and transmitted to the second driving cable 514.

Figure 13:
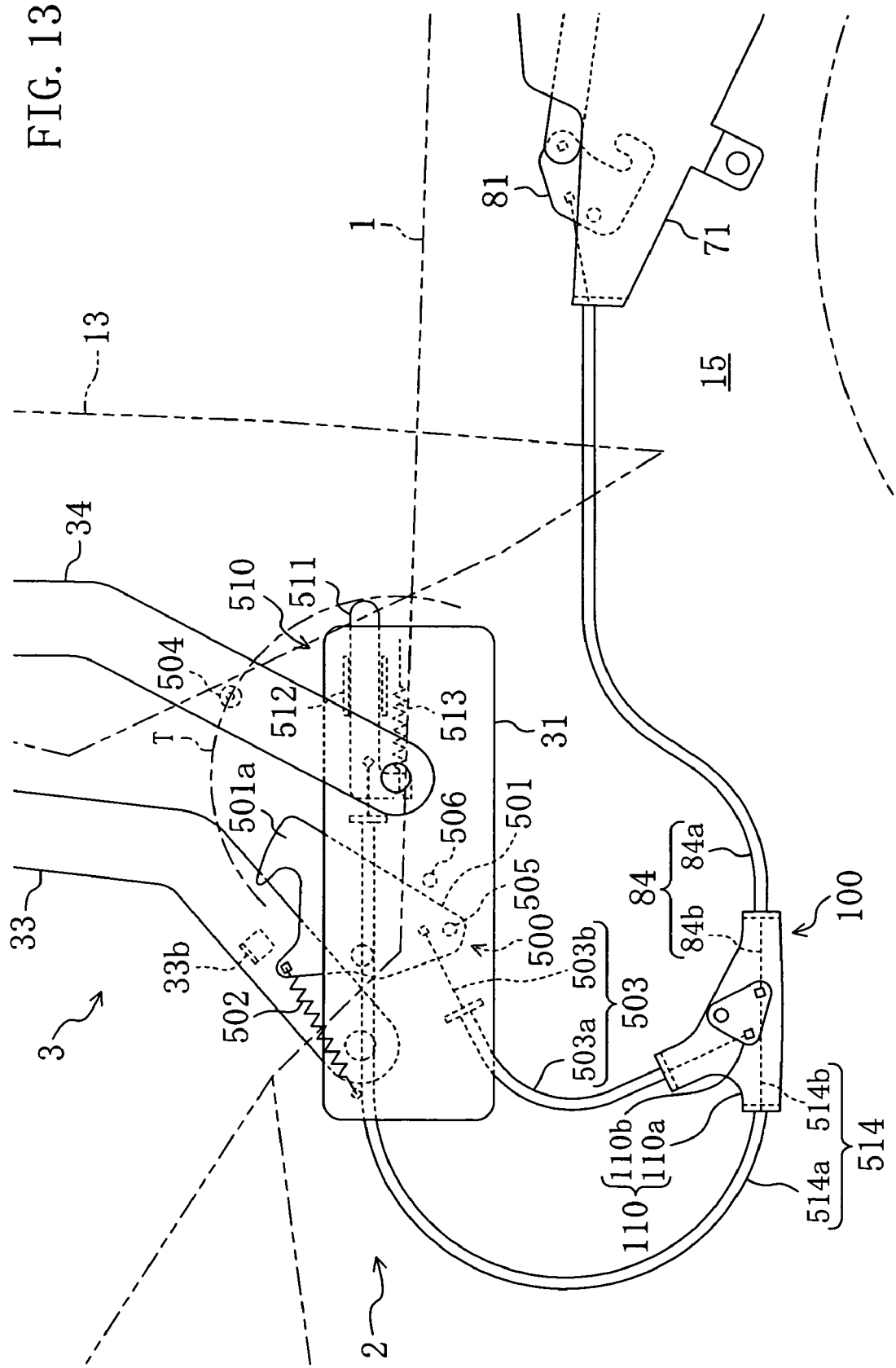
FIG. 13 is a schematic side view showing the roof panel opening/closing device when the roof panel is in opening/closing operation.

In this way, when restriction of the link mechanism 3 by the link restricting mechanism 500 is released, as shown in FIG. 13, the electric motor 4 is driven, and the front connecting link 33 and the rear connecting link 34 start backward rotation.

While the roof panel 12 performs opening/closing operation from fully closed state to stored state, i.e., while the trunk lid 14 is once brought from fully closed state to opened state and brought again to fully closed state, the hook 81 remains being rotated in the direction of releasing the engagement with the engaging pin 82, and therefore, the inner cable 84b of the input cable 84 remains in a state being pulled. Accordingly, the hook member 501 is held being rotated in the direction of releasing and at the same time, the engaging bar 511 is also held being moved forward.

In due course of time, as shown in FIG. 14, the roof panel 12 and the back window panel 13 are folded one above the other and are stored in the trunk room 15. After that, when the trunk lid 14 is brought into fully closed state, said transmitting mechanism 9 is brought into non-transmitting state, the locking mechanism 8 performs locking operation to lock the trunk lid 14. That is, the hook 81 rotates so as to be engaged with the engaging pin 82. In this way, the pulling force acting on the inner cable 84b of the inner cable 84 is released and as a result, as shown in FIG. 15, the hook member 501 rotates in engagement direction by biasing force of the biasing spring 502 and at the same time, the engaging bar 511 moves backward by biasing force of the biasing spring 513.

On this occasion, the roof panel 12 is stored in the trunk room 15, and the counter engaging hole 515 of said counter engaging member 516 provided to front edge portion of the roof panel 12 is located at a position opposed to the engaging bar 511. In other words, when the engaging bar 511 moves backward by biasing force of the biasing spring 513, it engages with the counter engaging hole 515 to lock the roof panel 12 in stored state. That is, the stored state locking mechanism 510 functions as the locking mechanism.

In the meantime, while the roof panel 12 is stored, the link restricting mechanism 500 for holding the roof panel 12 in fully closed state does not need to function as the locking mechanism. Therefore, when the roof panel 12 performs opening/closing operation towards stored state, as shown in FIGS. 14, 15, the hook member 501 is held at a position lower than the belt line BL formed on upper periphery of the vehicle body 1 and upper periphery of the trunk lid 14 by that the hook member 501 is rotated backward (i.e., releasing direction) together with the front connecting link 33, while said contacting bracket 33b of the front connecting link 33 rotating backward contacts with the contacting pin 505 provided to the hook member 501.

When the first driving cable 503 rotates to engagement position in non-driving state, the hook member 501 is in a state protruded upwardly from the belt line BL as shown in FIG. 8. While the roof panel 12 is in fully closed state, the hook member 501 can not be viewed from outside the vehicle even if protruded above the belt line BL since it is hidden by the back window panel 13. However, while the roof panel 12 is in stored state, since the back window panel 13 is stored in the trunk room 15 together with the roof panel 12, if the hook member 501 is protruded above the belt line BL, it is viewed from outside the vehicle, thereby deteriorating beauty. Therefore, as mentioned above, while the roof panel 12 is in stored state, it is rotated to a position not protruding from the belt line BL, in releasing direction together with the front connecting link 33 rotating backwardly, to be held at a position hidden by the vehicle body 1 in the side elevation. In the present embodiment, the contacting bracket 33b constitutes the contacting portion and the contacting pin 505 constitutes the counter contacting portion.

In this way, the roof panel 12 is held in fully closed state by the stored state locking mechanism 510 and at the same time, the trunk lid 14 is also held in fully closed state by the locking mechanism 8.

In the meantime, when the roof panel 12 performs opening/closing operation from stored state to fully closed state, the electric motor 10 is driven and, first, disengagement of the hook 81 and the engaging pin 82 is carried out. Since this operation results in pulling of the inner cable 84b of the inner cable 84, the hook member 501 is caused to rotate in releasing direction and at the same time, the engaging bar 511 is caused to move forward. As a result, engagement of the engaging bar 511 and counter engaging hole 515 is released. In this way, unlocking operation of the locking mechanism 8 for holding the trunk lid 14 and the same of the stored state locking mechanism 510 holding the roof panel 12 are carried out at the same time.

While the roof panel 12 performs opening/closing operation from stored state to fully closed state, i.e., while the trunk lid 14 is once brought from fully closed state to opened state and brought again to fully closed state, the hook 81 remains being rotated in the direction of releasing the engagement with the engaging pin 82, and therefore, the inner cable 84b of the input cable 84 remains in a state being pulled. Accordingly, the hook member 501 is held being rotated in the direction of releasing and at the same time, the engaging bar 511 is also held being moved forward.

In due course of time, when front edge portion of the roof panel 12 contacts with the front header 16 and the roof panel 12 is brought into fully closed state, the trunk lid 14 is also in the fully closed state, and the locking mechanism 8 performs locking operation for the trunk lid 14 in fully closed state. That is, the hook 81 rotates so as to be engaged with the engaging pin 82. The pulling force acting on the inner cable 84b of the input cable 84 is then released, and as a result, the hook member 501 rotates in engagement direction by biasing force of the biasing spring 502 and at the same time, the engaging bar 511 moves backward by biasing force of the biasing spring 513.

On this occasion, the roof panel 12 is in fully closed state and the engaging pin 504 provided to the rear connecting link 34 is in fully closed position capable of engaging with the hook member 501. That is, when the hook member 501 rotates in the engagement direction by biasing force of the biasing spring 502, the hook portion 501a engages with the engaging pin 504, thereby restricting the link mechanism 3 for the roof panel 12 in fully closed state. In other words, the link restricting mechanism 500 functions as the locking mechanism.

In the meantime, since the roof panel 12 is brought into fully closed state and does not exist in the trunk room 15, the stored state locking mechanism 510 does not function as the locking mechanism while the engaging bar 511 simply moves backward.

In this way, the roof panel 12 is held in fully closed state by the link restricting mechanism 500 and the trunk lid 14 is also held in fully closed sate by the locking mechanism 8.

Therefore, according to above-shown embodiment, the rear connecting link 34 can be made not rotatable with respect to the vehicle body 1 by restricting the rear connecting link 34 with respect to the vehicle body 1 by the link restricting mechanism 500, and the link mechanism 3 can be restricted with high rigidity when the roof panel 12 is in fully closed state. As a result, the roof panel 12 can be held with high rigidity, thereby preventing lifting of the roof panel 12 by aerodynamic force.

Further, in the link restricting mechanism 500, since the hook member 501 is provided to vehicle body side (base bracket 31) and the engaging pin 504 is provided to link side (rear connecting link 34), the biasing spring 502 and the first driving cable 503 can be provided to vehicle body side, which allows easy disposition of parts as compared to the configuration in which these parts are provided to link side.

Further, of the link mechanism 3, since the rear connecting link 34 instead of the front connecting link 33 is restricted to the vehicle body 1, holding rigidity of rear portion of the roof panel 12 can be improved, front edge portion of which is held to the front header 16 in fully closed state. As a result, the link restricting mechanism 500 can hold the roof panel 12 back and forth in a balanced manner in cooperation with the locking mechanism of the front edge portion, thereby effectively preventing lifting of the roof panel 12.

Furthermore, since the hook portion 501a of the hook member 501 is formed to have such a profile that the forefront portion 501c of the inner periphery 501b thereof is opened to outside of a circumference C3 is drawn around rotation center of the hook member 501 to pass the hook portion 501a. even if the engaging pin 504 is located at a position slightly shifted from original fully closed position when the roof panel 12 is fully closed state due to error at mounting of the engaging pin 504 to the rear connecting link 34 or shape error of the engaging pin 504 itself, when the hook member 501 rotates in engagement direction, the forefront portion 501c of the hook portion 501a contacts reliably with the engaging pin 504, and the engaging pin 504 can be engaged with the inner periphery 501b of the hook portion 501a. In other words, when the forefront portion 501c of the inner periphery 501b of the hook portion 501a is formed to have a profile opened to outside with respect to the circumference C3, installation error of the engaging pin 504 and own shape error are absorbed, thereby allowing reliable engagement.

Further, when the first driving cable 503 is disconnected by any chance, the hook member 501 rotates to the stop position and stops there, and the outer periphery 501d of the hook member 501 located on the movement track T of the engaging pin 504 is inclined with respect to the movement track T as mentioned above. Therefore, even if disconnection of the first driving cable 503 occurs when the roof panel 12 is in the other state than the fully closed state, the engaging pin 504 moving along the movement track T contacts with the outer periphery 501d of the hook member 501 and presses the hook member 501 to cause rotation in releasing direction when the roof panel 12 moves to fully closed state. As a result, such a trouble that, when the roof panel 12 performs opening/closing operation towards fully closed state, the engaging pin 504 interferes with the hook member 501 and movement till fully closed state is not possible can be prevented, and even if the first driving cable 503 is disconnected by any chance, the roof panel 12 can be brought reliably into fully closed state.

Further, when the roof panel 12 and the like are stored in the trunk room 15, the contacting bracket 33b of the front connecting link 33 is caused to contact with the contacting pin 505 of the hook member 501 and the hook member 501 is caused to rotate backward together with the front connecting link 33 to position the hook member 501 at a position lower than the belt line BL of the vehicle body 1 and to hold it there, thereby improving the beauty.

Although in the above shown embodiment, of the link mechanism 3, the rear connecting link 34 is restricted to the vehicle body 1 by the link restricting mechanism 500, the present invention is not limited thereto. That is, such a configuration that the front connecting link 33 is restricted to the vehicle body 1 by the link restricting mechanism 500 may be employed. However, as mentioned previously, restriction of the rear connecting link 34 is preferable since the roof panel 12 can be held back and forth in a balanced manner.

INDUSTRIAL APPLICABILITY

As described hereinbefore, the present invention is useful for an opening/closing device for a roof panel for preventing lifting of the roof panel in fully closed state, which roof panel is supported by a vehicle body via a link mechanism and capable of opening and closing a vehicle cabin space.

The invention claimed is:

1. An opening/closing device for a roof panel comprising:
a roof panel provided to a vehicle body, capable of opening and closing a vehicle cabin space;
a link mechanism for supporting the roof panel at the vehicle body, having a front connecting link member rotatably connected to each of said vehicle body and said roof panel, and a rear connecting link member rotatably connected to each of the vehicle body and the roof panel at rear side of the vehicle relative to the front connecting link member; and
a link restricting mechanism for restricting one of said front connecting link member and said rear connecting link member to the vehicle body when said roof panel is in fully closed state in which the vehicle cabin space is closed;
said link restricting mechanism includes:
an engaging member provided to the vehicle body;
a counter engaging portion to be engaged with said engaging member, being provided to one of said front connecting link member and said rear connecting member; and
a driving portion for driving the engaging member so as to engage said engaging member with said counter engaging portion and to disengage the same;
said engaging member has a hook portion formed in a bent hook shape and is provided to the vehicle body rotatably between an engaging position and a disengaging position, and has a biasing member for biasing the engaging member in a direction from the disengaging position to the engaging position so as to engage an inner periphery of the hooked portion with said counter engaging portion;
said driving portion is configured to rotate the engaging member from the engaging position to the disengaging position against biasing force of the biasing member so as to disengage the inner periphery of said hook portion from said counter engaging portion; and
a front end portion of the inner periphery of said hook portion is formed in a configuration being opened towards outside with respect to a circumference, which is centered at a rotation center of said engaging member and passes over said counter engaging portion.

2. An opening/closing device for a roof panel comprising:

a roof panel provided to a vehicle body, capable of opening and closing a vehicle cabin space;

a link mechanism for supporting the roof panel at the vehicle body, having a front connecting link member rotatably connected to each of said vehicle body and said roof panel, and a rear connecting link member rotatably connected to each of the vehicle body and the roof panel at rear side of the vehicle relative to the front connecting link member; and a link restricting mechanism for restricting one of said front connecting link member and said rear connecting link member to the vehicle body when said roof panel is in fully closed state in which the vehicle cabin space is closed;

said link restricting mechanism includes:

an engaging member provided to the vehicle body;

a counter engaging portion to be engaged with said engaging member, being provided to one of said front connecting link member and said rear connecting member; and a driving portion for driving the engaging member so as to engage said engaging member with said counter engaging portion and to disengage the same;

said engaging member has a hook portion formed in a bent hook shape and is provided to the vehicle body rotatably between an engaging position and a disengaging position, and has a biasing member for biasing the engaging member in a direction from the disengaging position to the engaging position so as to engage an inner periphery of the hooked portion with said counter engaging portion;

said driving portion is configured to rotate the engaging member from the engaging position to the disengaging position against biasing force of the biasing member so as to disengage the inner periphery of said hook portion from said counter engaging portion; and an outer periphery of said hook portion is formed in a configuration having a slope shape relative to a moving track of said counter engaging portion in such a manner that, while said driving portion is in non-driving condition, said outer periphery of said hook portion is structured to be located on the movement track on which said counter engaging portion moves while said roof panel is moving toward said fully closed state, and when said counter engaging portion contacts said outer periphery in a state where said outer periphery is located on said movement track, said engaging member rotates from said engaging position to said disengaging position by a pressing force thereof.

3. An opening/closing device for a roof panel comprising:

a roof panel provided to a vehicle body, capable of opening and closing a vehicle cabin space;

a link mechanism for supporting the roof panel at the vehicle body, having a front connecting link member rotatably connected to each of said vehicle body and said roof panel, and a rear connecting link member rotatably connected to each of the vehicle body and the roof panel at rear side of the vehicle relative to the front connecting link member; and a link restricting mechanism for restricting one of said front connecting link member and said rear connecting link member to the vehicle body when said roof panel is in fully closed state in which the vehicle cabin space is closed;

said link restricting mechanism includes:

an engaging member provided to the vehicle body;

a counter engaging portion to be engaged with said engaging member, being provided to one of said front connecting link member and said rear connecting member; and a driving portion for driving the engaging member so as to engage said engaging member with said counter engaging portion and to disengage the same;

said roof panel is structured to be stored in a roof panel storage portion formed at rear part of a vehicle when said vehicle cabin space is being opened;

said counter engaging portion is provided to said rear connecting link member;

said engaging member has a hook portion formed in a bent hook shape and is provided to the vehicle body rotatably between an engaging position and a disengaging position, and has a biasing member for biasing the engaging member in a direction from the disengaging position to the engaging position so as to engage an inner periphery of the hook portion with said counter engaging portion, and a counter contacting portion for being contacted by said front connecting link member when said roof panel is being stored in said roof panel storage portion;

said driving portion is structured to rotate the engaging member from the engaging position to the disengaging position against biasing force of the biasing member so as to disengage the inner periphery of said hook portion from said counter engaging portion; and said front connecting link member has a contacting portion for contacting said counter contacting portion of said engaging member, and causes the contacting portion to contact the counter contacting portion when said roof panel is stored in the roof panel storage portion to rotate the engaging member against biasing force of said biasing member to a position where the engaging member is not visible being hidden by the vehicle body in side elevation and to hold the same at that position.

* * * * *